United States Patent
Yoon et al.

(10) Patent No.: US 12,524,090 B2
(45) Date of Patent: Jan. 13, 2026

(54) DISPLAY DEVICE AND METHOD FOR MANUFACTURING THE SAME

(71) Applicant: Samsung Display Co., LTD., Yongin-si (KR)

(72) Inventors: Byung-Seo Yoon, Yongin-si (KR); Yong-Kwan Kim, Yongin-si (KR); Sungguk An, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 411 days.

(21) Appl. No.: 18/204,594

(22) Filed: Jun. 1, 2023

(65) Prior Publication Data

US 2024/0085998 A1 Mar. 14, 2024

(30) Foreign Application Priority Data

Sep. 13, 2022 (KR) .......................... 10-2022-0115034

(51) Int. Cl.
| | |
|---|---|
| *H10K 59/40* | (2023.01) |
| *G06F 3/041* | (2006.01) |
| *H10K 59/12* | (2023.01) |
| *H10K 59/80* | (2023.01) |
| *H10K 77/10* | (2023.01) |
| *H10K 102/00* | (2023.01) |

(52) U.S. Cl.
CPC ....... *G06F 3/0412* (2013.01); *H10K 59/1201* (2023.02); *H10K 59/40* (2023.02); *H10K 59/873* (2023.02); *H10K 77/111* (2023.02); *H10K 2102/311* (2023.02)

(58) Field of Classification Search
None
See application file for complete search history.

(56) References Cited

U.S. PATENT DOCUMENTS

| | | | |
|---|---|---|---|
| 11,930,656 B2* | 3/2024 | Park | G06F 1/1641 |
| 2020/0015391 A1* | 1/2020 | Lee | H05K 9/0084 |
| 2021/0269664 A1 | 9/2021 | Koo et al. | |

FOREIGN PATENT DOCUMENTS

| | | |
|---|---|---|
| KR | 102238702 B1 | 4/2021 |
| KR | 102260185 B1 | 6/2021 |
| KR | 1020210079208 A | 6/2021 |
| KR | 1020210103399 A | 8/2021 |
| KR | 102354860 B1 | 1/2022 |

OTHER PUBLICATIONS

Park, et al., Comb-type polymer-hybridized MXene nanosheets dispersible in arbitrary polar, nonpolar, and ionic solvents, Science Advances, Mar. 30, 2022, vol. 8, Issue 13.

* cited by examiner

*Primary Examiner* — Kyoung Lee
(74) *Attorney, Agent, or Firm* — CANTOR COLBURN LLP

(57) ABSTRACT

A display device includes: a display panel including a first non-folding region, a second non-folding region, and a folding region disposed between the first non-folding region and the second non-folding region; and a lower member disposed below the display panel. The lower member includes: a digitizer disposed below the display panel and including a base layer and a plurality of coils disposed on one surface of the base layer; and a functional layer disposed below the digitizer, where the functional layer contains MXene.

20 Claims, 17 Drawing Sheets

DISPLAY DEVICE AND METHOD FOR MANUFACTURING THE SAME

This application claims priority to Korean Patent Application No. 10-2022-0115034, filed on Sep. 13, 2022, and all the benefits accruing therefrom under 35 U.S.C. § 119, the content of which in its entirety is herein incorporated by reference.

BACKGROUND

The present disclosure herein relates to a display device and a method of manufacturing the display device, and more particularly, to a display device having improved folding characteristics.

A display device includes an active region activated in response to an electrical signal. The display device may detect an input externally applied through the active region and display various images to provide a user with information. As display devices having various shapes have been developed, active regions having various shapes are being implemented.

SUMMARY

The present disclosure provides a display device capable of reducing the thickness of a stacked structure thereof and improving folding characteristics thereof, and a method of manufacturing the same.

An embodiment of the invention provides a display device including: a display panel including a first non-folding region, a second non-folding region, and a folding region disposed between the first non-folding region and the second non-folding region; and a lower member disposed below the display panel, wherein the lower member includes: a digitizer disposed below the display panel and including a base layer and a plurality of coils disposed on one surface of the base layer; and a functional layer disposed below the digitizer, wherein the functional layer contains MXene.

In an embodiment, the functional layer may include neither magnetic metal powder (MMP) nor copper (Cu).

In an embodiment, the functional layer may include at least one of a transition metal carbide, a transition metal nitride, and a transition metal carbonitride. The functional layer may include a sheet of a two-dimensional inorganic material.

In an embodiment, the thickness of the functional layer may be about 0.1 micrometer to about 10 micrometers.

In an embodiment, the sum of the thickness of the functional layer and the thickness of the digitizer may be about 60 micrometers to about 90 micrometers.

In an embodiment, the display device may further include a barrier layer disposed between the display panel and the lower member.

In an embodiment, the display device may further include an adhesive layer disposed between the functional layer and the digitizer.

In an embodiment, the lower member may further include a support layer including a first support portion overlapping the first non-folding region, a second support portion overlapping the second non-folding region, and a folding part overlapping the folding region and having a plurality of openings defined therein.

In an embodiment, the digitizer may include a first digitizer corresponding to the first support portion, and a second digitizer corresponding to the second support portion and spaced apart from the first digitizer.

In an embodiment, the functional layer includes a first functional layer in contact with a lower surface of the first digitizer, and a second functional layer in contact with a lower surface of the second digitizer, wherein each of the first functional layer and the second functional layer may contain the MXene.

In an embodiment, the display device may further include a cover layer disposed between the support layer and the digitizer and attached to and below the folding part.

In an embodiment, the digitizer may include a folding portion overlapping a folding region and having a plurality of holes defined therein, a first non-folding portion overlapping the first non-folding region, and a second non-folding portion overlapping the second non-folding region.

In an embodiment, the functional layer may be disposed directly on a lower surface of each of the first non-folding portion, the second non-folding portion, and the folding portion.

In an embodiment, at least a portion of the functional layer may be disposed in the plurality of holes.

In an embodiment, the lower member may further include a resin layer disposed in the plurality of holes.

In an embodiment, the lower member may be composed of the digitizer and the functional layer.

In an embodiment of the invention, a method for manufacturing a display device includes: providing a preliminary display module including a display panel including a first non-folding region, a second non-folding region, and a folding region disposed between the first non-folding region and the second non-folding region and a digitizer disposed below the display panel; and coating a composition containing MXene below the digitizer.

In an embodiment, the preliminary display module may further include a support layer disposed between the display panel and the digitizer.

In an embodiment, the coating of the composition may include coating an ink containing MXene below the digitizer.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

Figure 9A:
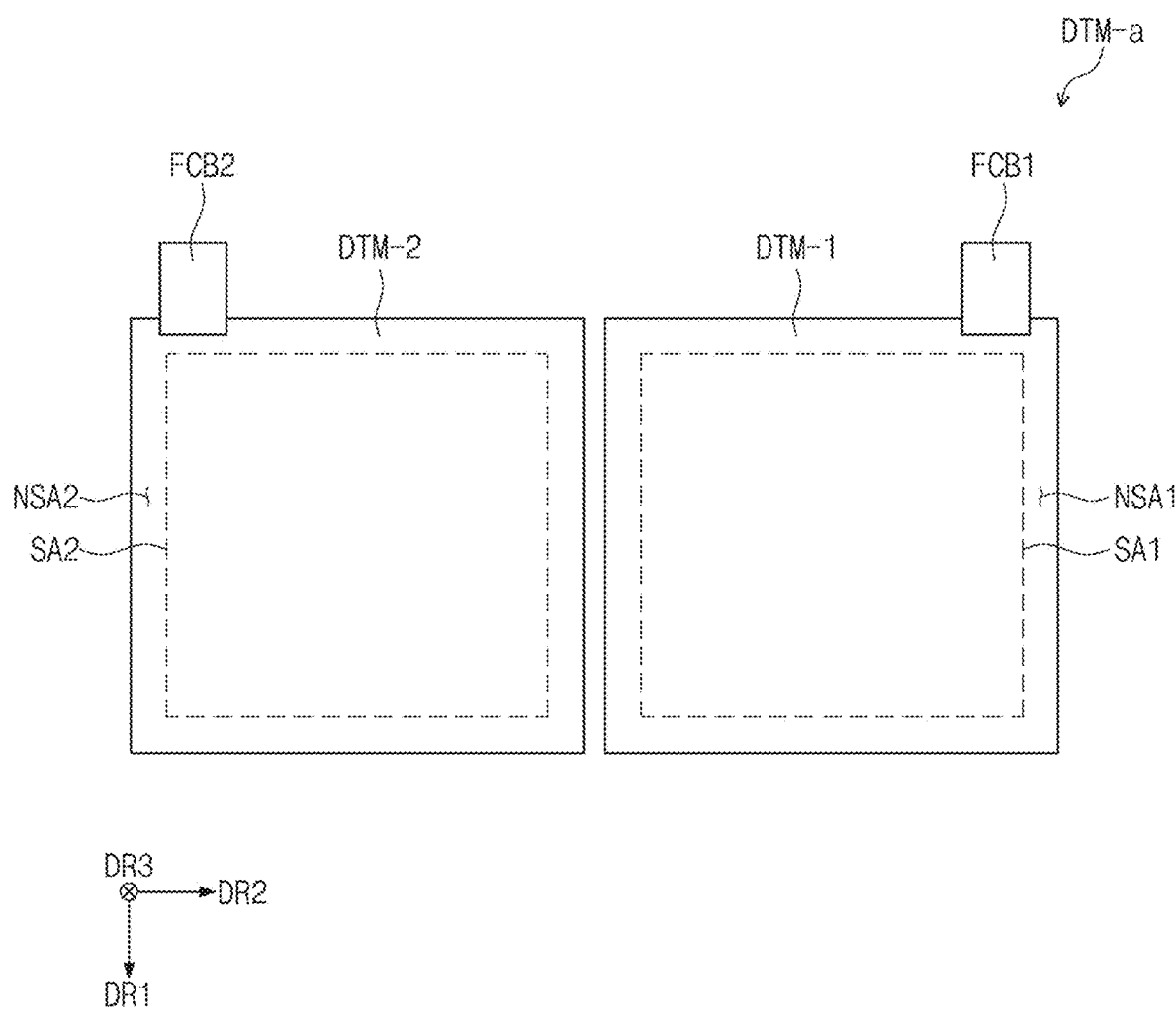
Figure 9B:
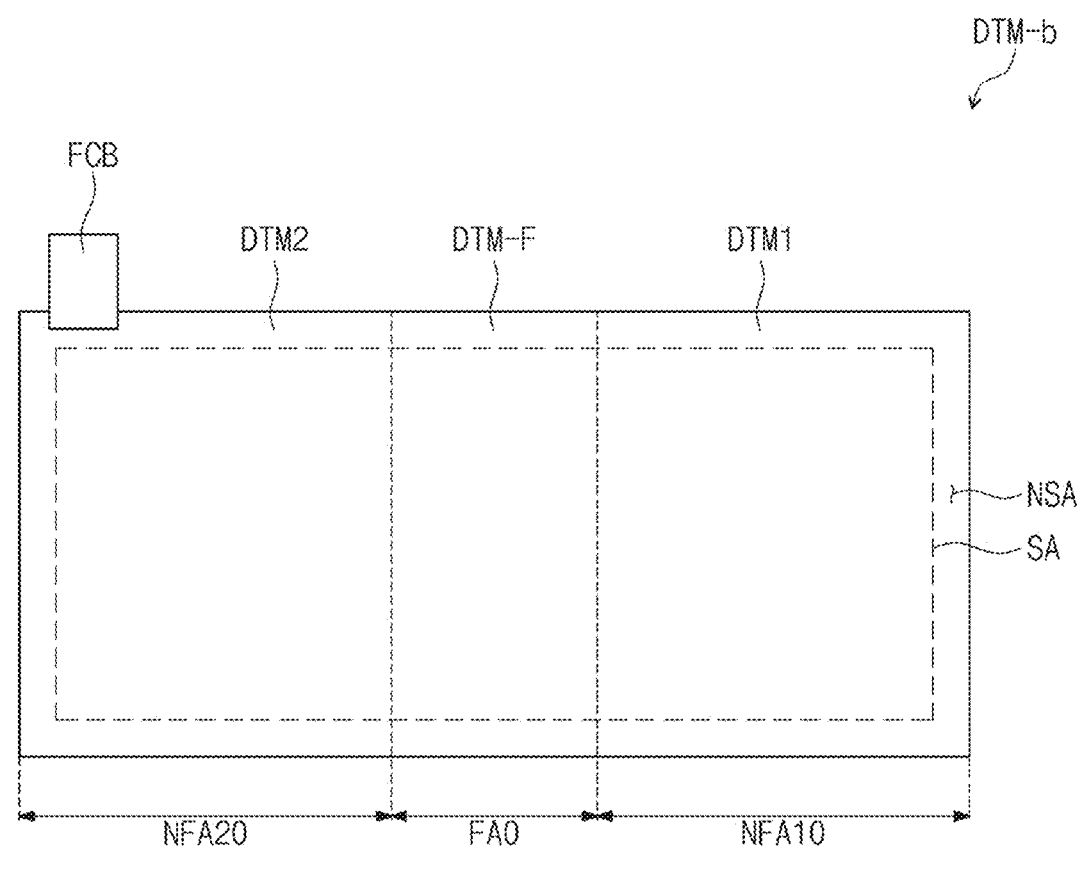
Figure 9C:
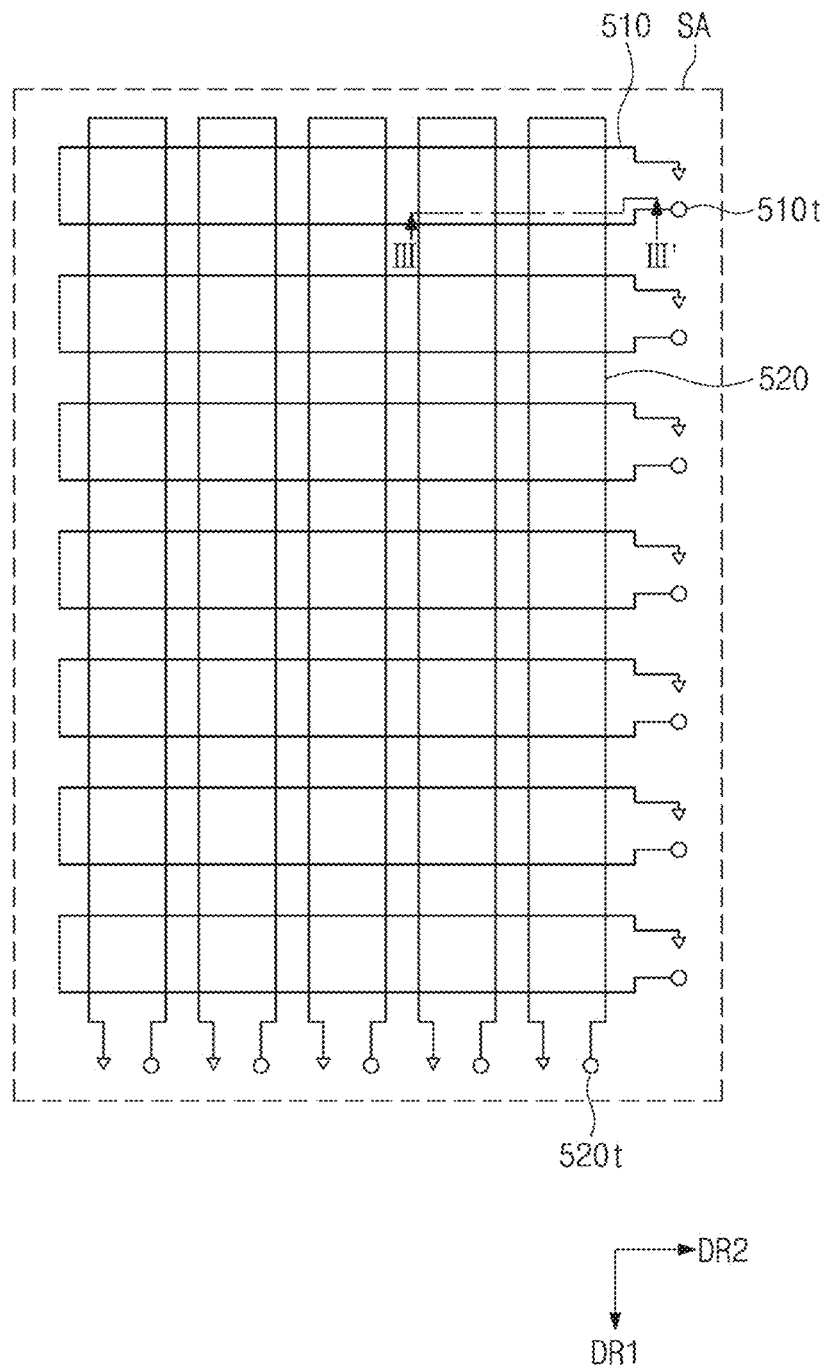
Figure 9D:
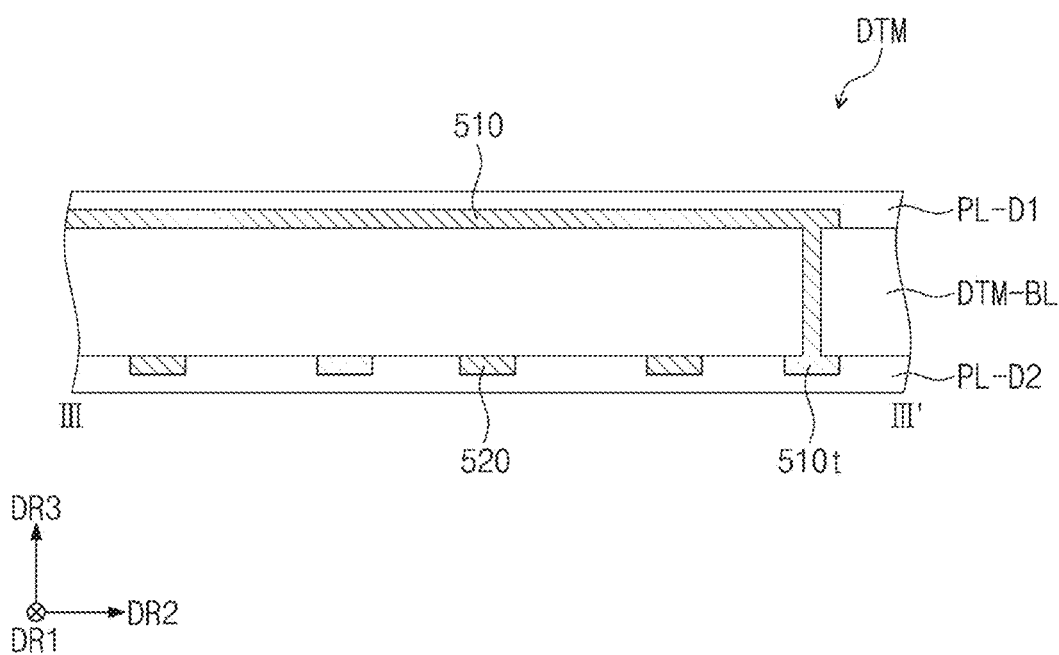
Figure 10:
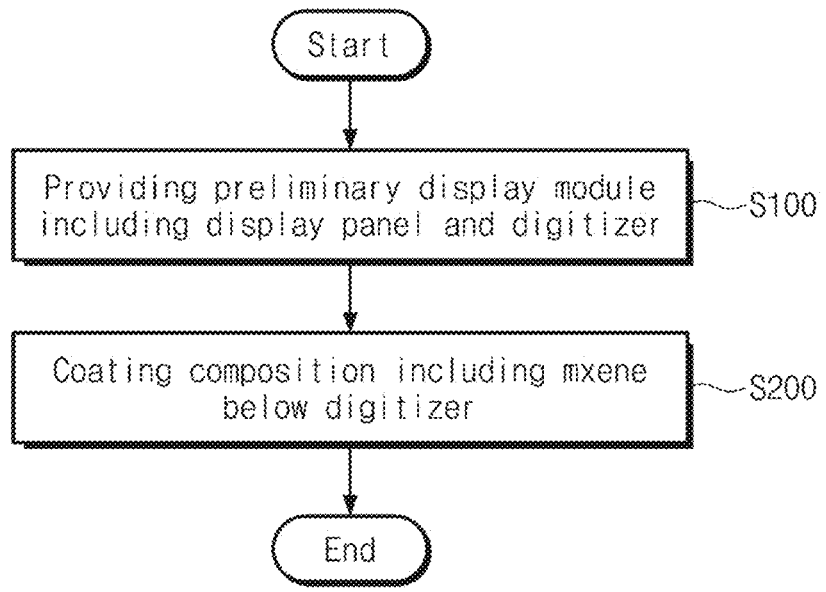

Each of FIGS. 8A to 8D is a cross-sectional view of a lower member according to an embodiment of the invention;

Each of FIGS. 9A and 9B is a plan view of a digitizer according to an embodiment of the invention;

FIG. 9C is a plan view of a sensing region of a digitizer according to an embodiment of the invention;

FIG. 9D is a cross-sectional view of the sensing region of the digitizer according to an embodiment of the invention; and FIG. 10 is a flowchart showing a method of manufacturing a display device according to an embodiment of the invention.

DETAILED DESCRIPTION

Hereinafter, embodiments of the invention will be described with reference to the drawings.

In this specification, it will be understood that when an element (or region, layer, portion, etc.) is referred to as "being on", "connected to" or "coupled to" another element, it can be directly on, connected or coupled to the other element, or intervening elements may be present between them.

The same reference numerals refer to the same elements. In addition, in the drawings, the thicknesses, ratios, and dimensions of elements are exaggerated for effective description of technical content. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." "And/or" includes all combinations of one or more that the associated elements may define.

Terms such as first and second may be used to describe various elements, but the elements should not be limited by the terms. These terms are only used for the purpose of distinguishing one element from other elements. For example, without departing from the scope of the present invention, a first element may be referred to as a second element, and similarly, a second element may be referred to as a first element. Singular expressions include plural expressions unless the context clearly indicates otherwise.

In addition, terms such as "below", "lower", "above", and "upper" are used to describe the relationship between elements shown in the drawings. The terms are relative concepts and are described based on the directions indicated in the drawings.

Terms such as "include" or "have" are intended to designate the presence of a feature, number, step, action, element, portion, or combination thereof described in the specification, and it should be understood that it does not preclude the possibility of presence or addition of one or more other features, numbers, steps, operations, elements, portions, or combinations thereof.

In this specification, the expression "being directly disposed" may mean that there is no layer, film, region, plate, or the like which is added between a part of a layer, film, region, plate, or the like and another part. For example, the expression "being directly disposed" may mean being disposed between two layers or two members without an additional member such as an adhesive member interposed therebetween.

Unless otherwise defined, all terms (including technical and scientific terms) used in this specification have the same meaning as commonly understood by one of ordinary skill in the art to which this invention belongs. In addition, it will be further understood that terms, such as those defined in commonly used dictionaries, should be interpreted as having a meaning that is consistent with their meaning in the context of the related technology, and should not be interpreted in an idealized or overly formal sense unless expressly so defined herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, embodiments of the invention will be described with reference to the accompanying drawings.

Figure 1A:
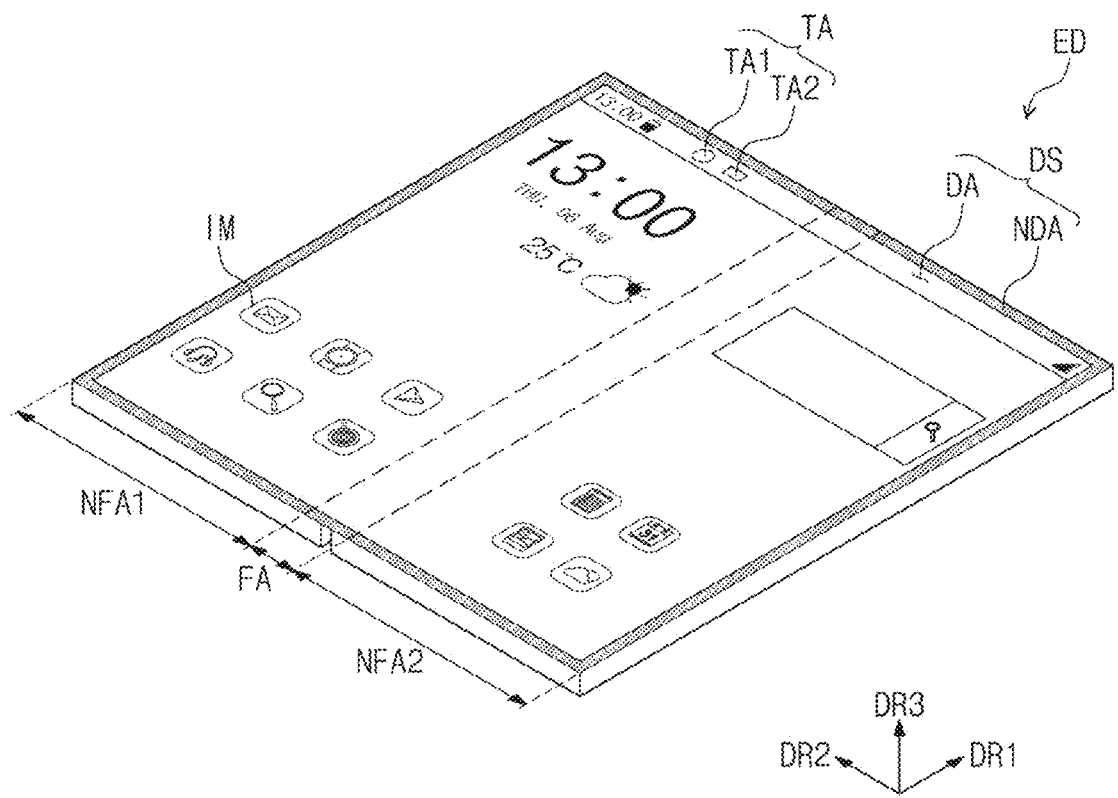
FIGS. 1A to 1C are perspective views of an electronic device according to an embodiment of the invention.
Figure 1B:
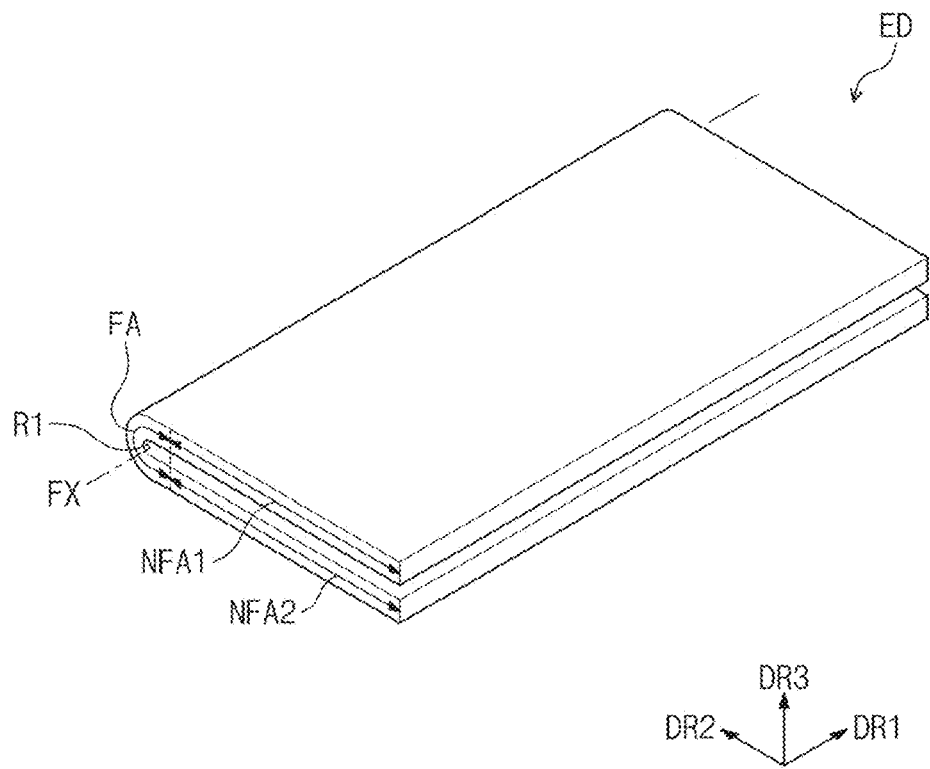
Figure 1C:
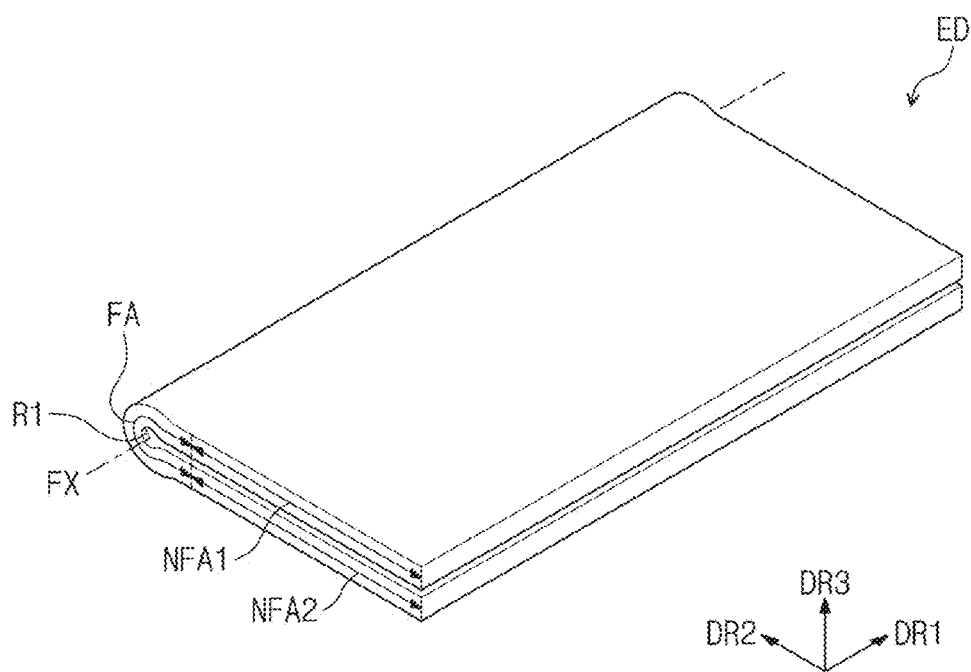

FIGS. 1A to 1C are perspective views of an electronic device ED according to an embodiment of the invention. FIG. 1A illustrates the electronic device ED in an unfolded state, and FIGS. 1B and 1C illustrate the electronic device ED in a folded state.

Referring to FIGS. 1A to 1C, the electronic device ED according to an embodiment of the invention may include a display surface DS defined by a first direction DR1 and a second direction DR2 crossing the first direction DR1. The electronic device ED may provide an image IM to a user through the display surface DS.

The display surface DS may include a display region DA and a non-display region NDA around the display region DA. The display region DA may display an image IM, and the non-display region NDA may not display an image IM. The non-display region NDA may surround the display region DA. However, the embodiment of the invention is not limited thereto, and the shape of the display region DA and the shape of the non-display region NDA may be changed.

The display surface DS may further include a signal transmission region TA. The signal transmission region TA may be a partial region of the display region DA or a partial region of the non-display region NDA. As illustrated in FIG. 1A, the signal transmission region TA may be a portion of the display region DA. The signal transmission region TA has a higher light transmittance than the display region DA and the non-display region NDA. Natural light, visible light, or infrared light may move to the signal transmission region TA. The electronic device ED may further include a camera module configured to capture an external image by using visible light passing through the signal transmission region TA, or a sensor module configured to detect the approach of an external object by using infrared light.

Unlike the illustration of FIG. 1A, in an embodiment of the invention, the signal transmission region TA may extend from the non-display region NDA without being spaced apart from the non-display region NDA. The signal transmission region TA may be provided in plurality.

Hereinafter, a direction substantially perpendicular to a plane defined by the first direction DR1 and the second direction DR2 is defined as a third direction DR3. In addition, in this specification, the expression "on a plane" or "in a plan view" may be defined as a state viewed from the third direction DR3.

The electronic device ED may include a folding region FA and a plurality of non-folding regions NFA1 and NFA2. The non-folding regions NFA1 and NFA2 may include a first non-folding region NFA1 and a second non-folding region NFA2. In the second direction DR2, the folding region FA may be disposed between the first non-folding region NFA1 and the second non-folding region NFA2.

As illustrated in FIG. 1B, the folding region FA may be folded based on a folding axis FX parallel to the first direction DR1. The folding region FA has a predetermined curvature and a predetermined curvature radius RI. The first non-folding region NFA1 and the second non-folding region NFA2 may face each other, and the electronic device ED may be inner-folded so that the display surface DS is not exposed to the outside.

In an embodiment of the invention, the electronic device ED may be outer-folded so that the display surface DS is exposed to the outside. In an embodiment of the invention, the electronic device ED may be configured so that an inner-folding operation or an outer-folding operation repeats each other from an unfolding operation, but the embodiment of the invention is not limited thereto. In an embodiment of the invention, the electronic device ED may be configured so as to select any one of an unfolding operation, an inner-folding operation, and an outer-folding operation.

As illustrated in FIG. 1B, a distance between the first non-folding region NFA1 and the second non-folding region NFA2 may be substantially equal to the curvature radius RI, but the distance between the first non-folding region NFA1 and the second non-folding region NFA2 may be smaller than the curvature radius RI as illustrated in FIG. 1C. FIGS. 1B and 1C are illustrated based on the display surface DS, and two portions of a case EDC (see FIG. 2) configured to form the exterior of the electronic device ED may come in contact with each other at end regions of the first non-folding region NFA1 and the second non-folding region NFA2.

FIGS. 1A to 1C illustrate that the electronic device ED includes two non-folding regions NFA1 and NFA2 and one folding region FA arranged therebetween, but the embodiment of the invention is not limited thereto, and the electronic device ED may include a plurality of folding regions and be folded a plurality of times.

Figure 2:
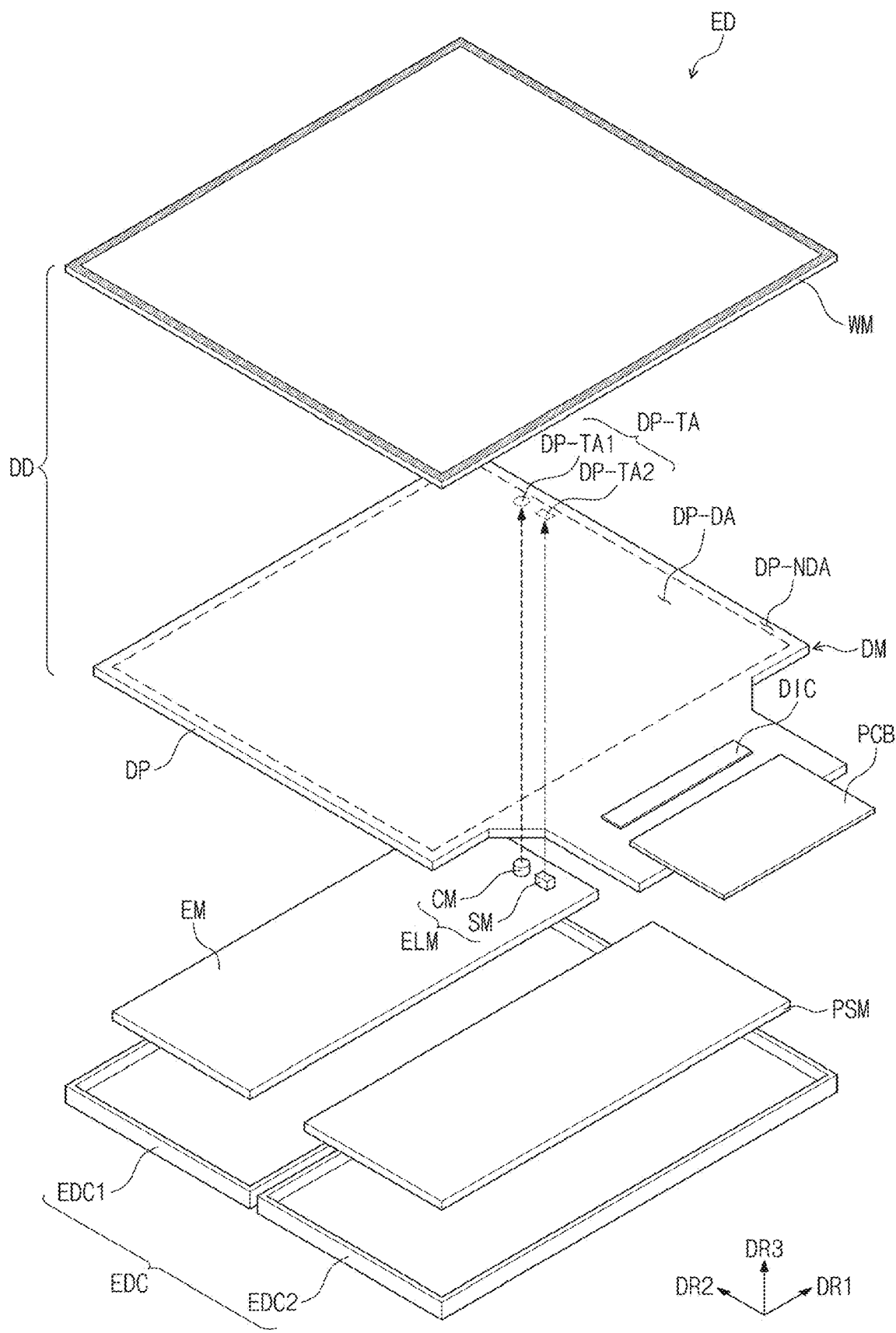
FIG. 2 is an exploded perspective view of the electronic device according to an embodiment of the invention.
Figure 3:
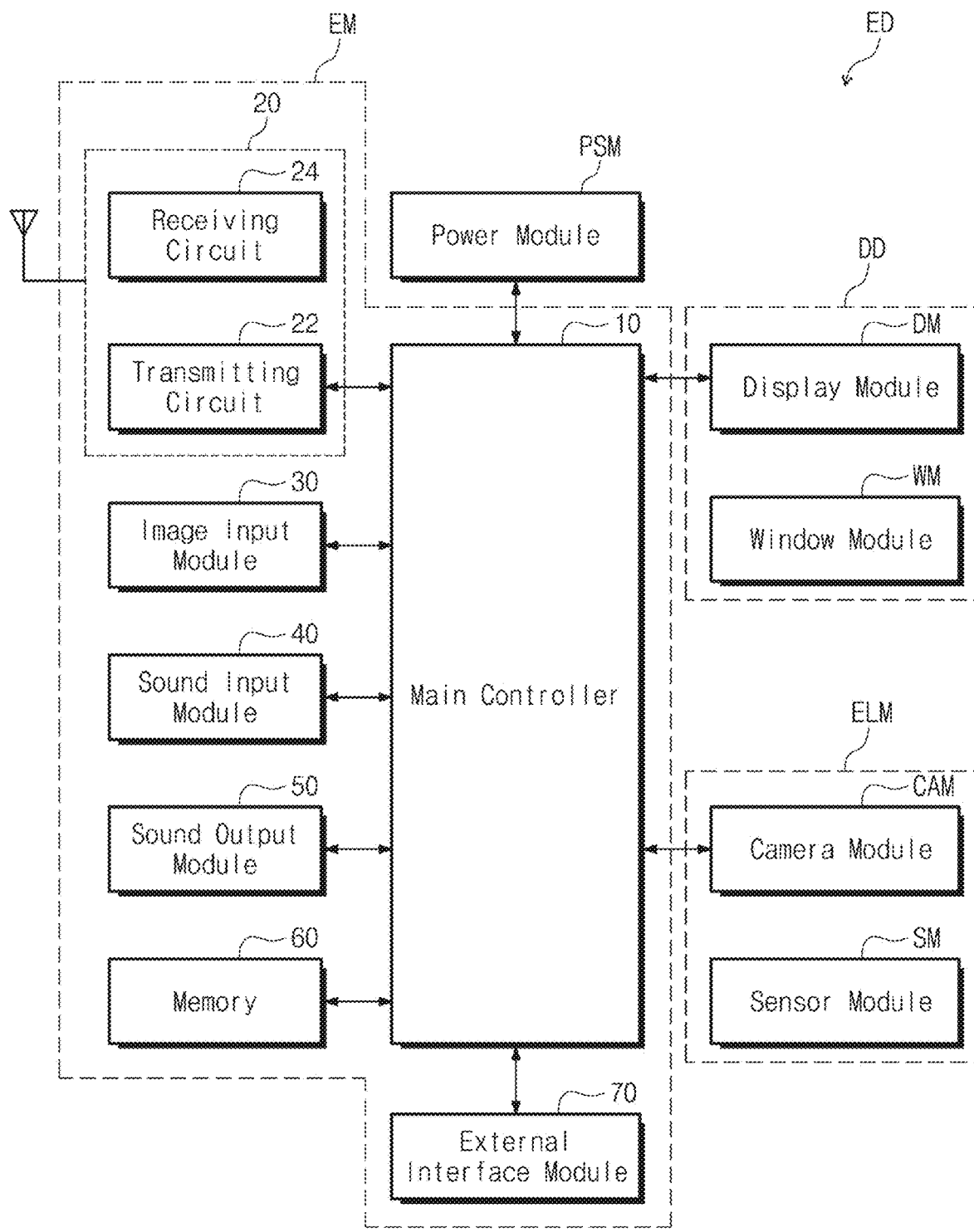
FIG. 3 is a block diagram of the electronic device according to an embodiment of the invention.
Figure 4:
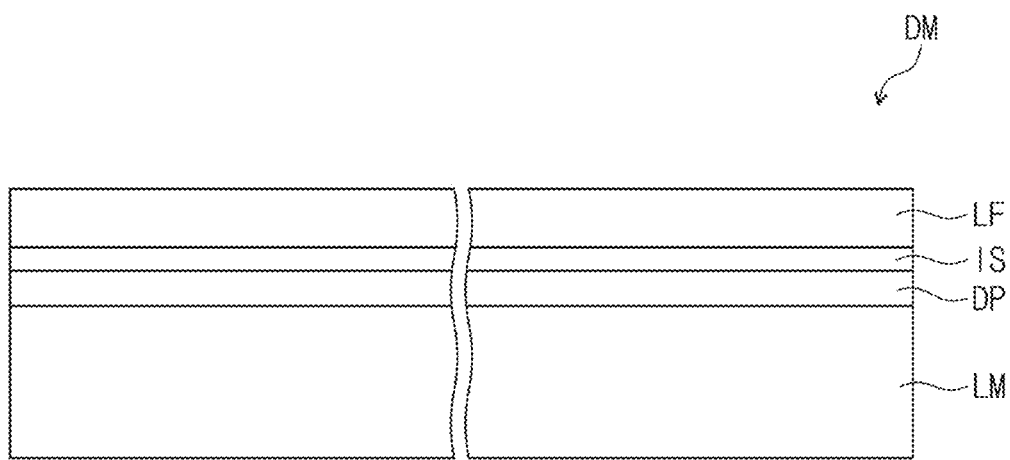
FIG. 4 is a cross-sectional view of a display module according to an embodiment of the invention.

FIG. 2 is an exploded perspective view of the electronic device ED according to an embodiment of the invention. FIG. 3 is a block diagram of the electronic device ED according to an embodiment of the invention. FIG. 4 is a cross-sectional view of a display module DM according to an embodiment of the invention.

As illustrated in FIG. 2, the electronic device ED may include a display device DD, a control module EM, a power module PSM, an electronic module ELM, and a case EDC. Although not illustrated separately, the power module PSM may further include a mechanical structure configured to control the folding operation of the display device DD.

The display device DD generates an image and senses an external input. The display device DD includes a window module WM and a display module DM. The window module WM provides the front surface of the electronic device ED.

The display module DM may include at least a display panel DP. FIG. 2 illustrates only the display panel DP among the stacked structure of the display module DM, but substantially, the display module DM may further include a plurality of components disposed above and below the display panel DP. A detailed description of the stacked structure of the display module DM will be given later.

The display panel DP includes a display region DP-DA and a non-display region DP-NDA corresponding to the display region DA (see FIG. 1A) and the non-display region NDA (see FIG. 1A) of the electronic device ED. In this specification, the expression "a region/portion corresponds to another region/portion" means that they overlap each other, but the expression is not limited to having a same area. The display module DM may include a driving chip DIC disposed on the non-display region DP-NDA. The display module DM may further include a printed circuit board PCB coupled to the non-display region DP-NDA.

The display panel DP may further include a signal transmission region DP-TA. The signal transmission region TA may be an opening or a region having a lower resolution than the display region DP-DA. As a result, the signal transmission region DP-TA has a higher light transmittance than the display region DP-DA and the non-display region DP-NDA. The signal transmission region DP-TA of the display panel DP may correspond to the signal transmission region TA (see FIG. 1A) of the electronic device ED described above. The signal transmission region DP-TA may include a first signal transmission region DP-TA1 corresponding to the camera module CM and a second signal transmission region DP-TA2 corresponding to the sensor module SM.

The driving chip DIC may include driving elements, for example, a data driving circuit configured to drive the pixels of the display panel DP. FIG. 2 illustrates a structure in which the driving chip DIC is mounted on the display panel DP, but the embodiment of the invention is not limited thereto. For example, the driving chip DIC may be mounted on the printed circuit board PCB in another embodiment.

The control module EM includes at least a main controller 10. The control module EM may include a main controller 10, a wireless communication module 20, an image input module 30, a sound input module 40, a sound output module 50, a memory 60, an external interface module 70 and the like. The modules may be mounted on the circuit board or electrically connected through a flexible circuit board. The control module EM may be electrically connected to the power module PSM.

The main controller 10 controls the overall operation of the electronic device ED. For example, the main controller 10 activates or deactivates the display device DD according to a user input. The main controller 10 may control the image input module 30, the sound input module 40, the sound output module 50, and the like according to the user input. The main controller 10 may include at least one microprocessor.

The wireless communication module 20 may transmit/receive a wireless signal to/from another terminal by using a Bluetooth or Wi-Fi line. The wireless communication module 20 may transmit/receive a voice signal by using a general communication line. The wireless communication module 20 includes a transmitting circuit 22 that modulates a signal to be transmitted and transmits the modulated signal, and a receiving circuit 24 that demodulates the received signal.

The image input module 30 processes image signals to convert the image signals into image data that may be displayed on the display device DD. The sound input module 40 receives external sound signals through a microphone in a recording mode, a voice recognition mode, or the like, and converts the external sound signals into electrical voice data. The sound output module 50 converts sound data received from the wireless communication module 20 or sound data stored in the memory 60 and outputs the sound data to the outside.

The external interface module 70 serves as an interface connected to an external charger, a wired/wireless data port, a card socket (e.g., a memory card socket, a SIM/UIM card socket), and the like.

The power module PSM supplies power for the overall operation of the electronic device ED. The power module PSM may include a general battery device.

The case EDC accommodates the display module DM, the control module EM, the power module PSM, and the electronic module ELM. The case EDC is illustrated as including two cases EDC1 and EDC2 separated from each other, but the embodiment of the invention is not limited thereto. Although not illustrated, the electronic device ED may further include a hinge structure configured to connect the two cases EDC1 and EDC2 to each other. The case EDC may be coupled to the window module WM. The case EDC protects the components accommodated in the case EDC, such as the display module DM, the control module EM, the power module PSM, and the electronic module ELM.

The electronic module ELM may be an electronic component that outputs or receives an optical signal. The electronic module ELM transmits or receives an optical signal through a partial region of the electronic device ED corresponding to the signal transmission region TA (see FIG. 1A). In this embodiment, the electronic module ELM may include a camera module CM. The camera module CM may receive a natural light signal through the first signal transmission region TA1 to capture an external image. The electronic module ELM may include a sensor module SM such as a proximity sensor or an ultraviolet light-emitting sensor. The sensor module SM may recognize a part of a user's body (e.g., fingerprint, iris, or face) through the second signal transmission region TA2 or measure the distance between an object and a mobile phone.

The electronic module ELM is disposed below the display device DD. The electronic module ELM is disposed to correspond to the signal transmission region TA (see FIG. TA) of the electronic device ED. That is, the electronic module ELM overlaps the signal transmission region DP-TA of the display panel DP in a plan view. The signal transmission region DP-TA of the display panel DP may have a higher light transmittance than other regions of the display panel DP.

Referring to FIG. 4, the display module DM may include a display panel DP, an input sensor IS disposed on the display panel DP, an anti-reflection layer LF disposed on the input sensor IS, and a lower member LM disposed below the display panel DP. An adhesive layer may be disposed between the members.

The display panel DP may include a base layer, a circuit element layer disposed on the base layer, a display element layer disposed on the circuit element layer, and a thin film encapsulation layer disposed on the display element layer. The base layer may include a plastic film. For example, the base layer may contain polyimide. The planar shape of the base layer may be substantially the same as the planar shape of the display panel DP illustrated in FIG. 6 to be described later.

The circuit element layer may include an organic layer, an inorganic layer, a semiconductor pattern, a conductive pattern, signal line, and the like. The organic layer, the inorganic layer, the semiconductor layer, and the conductive layer may be formed on the base layer by coating, deposition, and the like. Hereafter, the organic layer, the inorganic layer, the semiconductor layer, and the conductive layer may be selectively patterned through a plurality of photolithography processes to form a semiconductor pattern, a conductive pattern, and a signal line.

The semiconductor pattern, the conductive pattern, and the signal line may form a pixel driving circuit and signal lines SL1 to SLm, DL1 to DLn, ELi to ELm, CSL1, CSL2, and PL of the pixels PX illustrated in FIG. 6 to be described later. The pixel driving circuit may include at least one transistor.

The display element layer includes the light-emitting elements of the pixels PX illustrated in FIG. 6 to be described later. The light-emitting element is electrically connected to the at least one transistor. The thin film encapsulation layer may be disposed on the circuit element layer so as to seal the display element layer. The thin film encapsulation layer may include an inorganic layer, an organic layer, and an inorganic layer, which are sequentially stacked. The stacked structure of the thin film encapsulation layer is not particularly limited.

The input sensor IS may include a plurality of sensing electrodes (not illustrated) configured to sense an external input, trace lines (not illustrated) connected to the plurality of sensing electrodes, and an inorganic layer and/or an organic layer to insulate/protect the plurality of sensing electrodes or the trace lines. The input sensor IS may be a capacitive sensor, but is not particularly limited thereto.

The input sensor IS may be formed directly on the thin film encapsulation layer through a continuous process when the display panel DP is manufactured. However, the embodiment of the invention is not limited thereto, and the input sensor IS may be manufactured as a panel separate from the display panel DP and then attached to the display panel DP by an adhesive layer in another embodiment.

The anti-reflection layer LF may lower the reflectance of external light. The anti-reflection layer LF may include a retarder and/or a polarizer. The anti-reflection layer LF may include at least a polarizing film. Alternatively, the anti-reflection layer LF may include color filters. The color filters may have a predetermined arrangement. The arrangement of the color filters may be determined in consideration of the light-emitting colors of the pixels included in the display panel DP. The anti-reflection layer LF may further include a partition layer adjacent to the color filters.

The lower member LM may include various functional members. The lower member LM may include a support layer configured to support the display panel DP, a heat dissipation layer configured to emit heat generated in the display panel DP, and the like.

Figure 5:
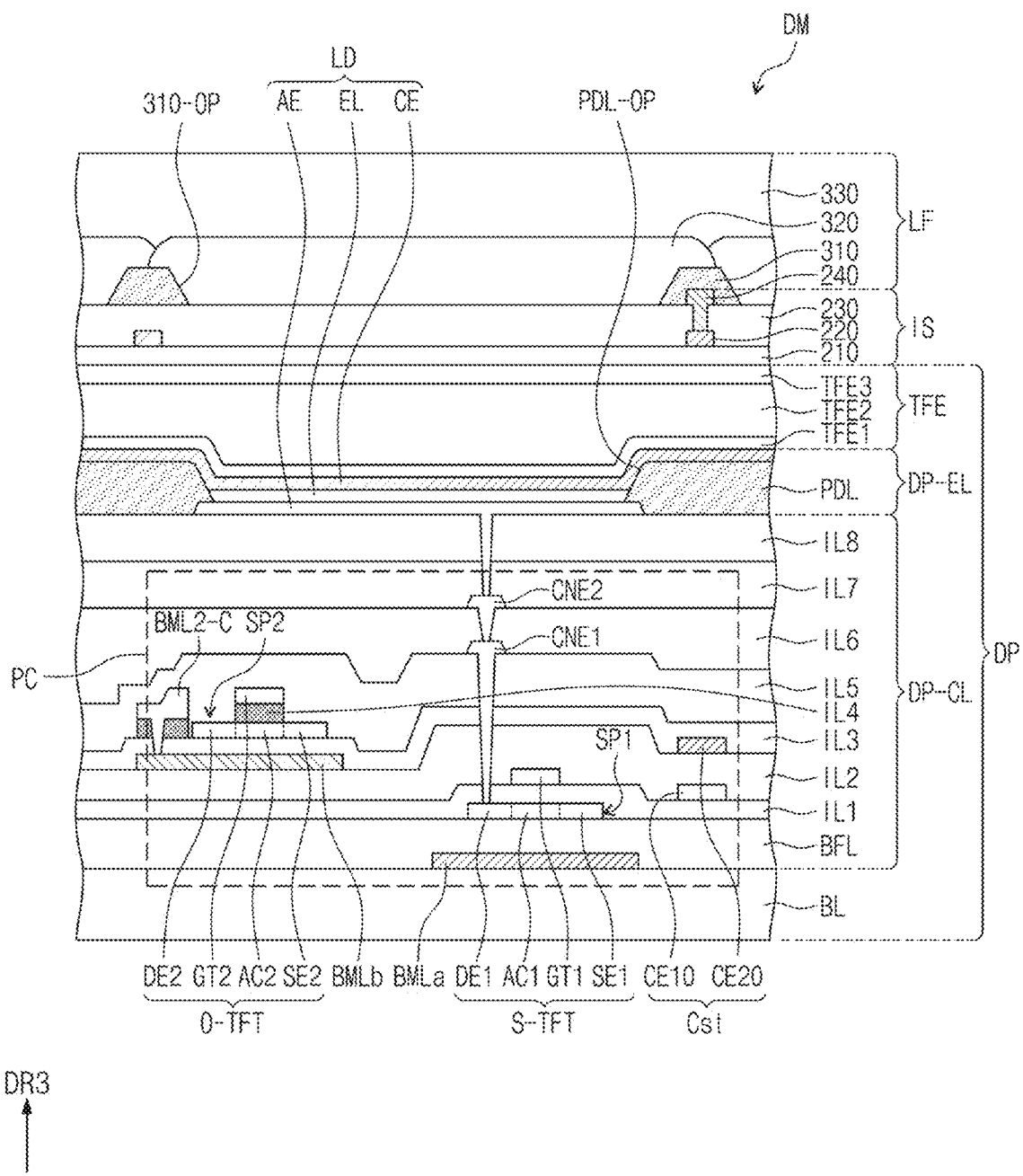
FIG. 5 is a cross-sectional view illustrating a partial configuration of the display module according to an embodiment of the invention.

FIG. 5 is a cross-sectional view illustrating a partial configuration of the display module DM according to an embodiment of the invention. FIG. 5 more detailly illustrates components corresponding to one pixel, such as the display panel DP, the input sensor IS, and the anti-reflection layer LF among the display module DM illustrated in FIG. 4.

FIG. 5 illustrates one light-emitting element LD and a silicon transistor S-TFT and an oxide transistor O-TFT of a pixel circuit PC. At least one of a plurality of transistors included in the pixel circuit PC may be an oxide transistor O-TFT, and the remaining transistors may be silicon transistors S-TFT.

A buffer layer BFL may be disposed on a base substrate BL. The buffer layer BFL may prevent metal atoms or impurities from diffusing from the base substrate BL into a first semiconductor pattern SP1 and above. The first semiconductor pattern SP1 includes an active region ACT of the silicon transistor S-TFT. The buffer layer BFL may control a heat supply rate during a crystallization process for forming the first semiconductor pattern SP1 so that the first semiconductor pattern SP1 is uniformly formed.

A first back-surface metal layer BMLa may be disposed below the silicon transistor S-TFT, and a second back-surface metal layer BMLb may be disposed below the oxide transistor O-TFT. The first and second back-surface metal layers BMLa and BMLb may be disposed to overlap the pixel circuit PC in a plan view. The first and second back-surface metal layers BMLa and BMLb may block external light from reaching the pixel circuit PC.

The first back-surface metal layer BMLa may be disposed to correspond to at least a partial region of the pixel circuit PC. The first back-surface metal layer BMLa may be disposed to overlap a driving transistor implemented as a silicon transistor S-TFT in a plan view.

The first back-surface metal layer BMLa may be disposed between the base substrate BL and the buffer layer BFL. In an embodiment of the invention, an inorganic barrier layer may be further disposed between the first back-surface metal layer BMLa and the buffer layer BFL. The first back-surface metal layer BMLa may be connected to an electrode or a line and receive a constant voltage or a signal therefrom. According to an embodiment of the invention, the first back-surface metal layer BMLa may be a floating electrode isolated from another electrode or line.

The second back-surface metal layer BMLb may be disposed to correspond to the lower portion of the oxide transistor O-TFT. The second back-surface metal layer BMLb may be disposed between a second insulating layer IL2 and a third insulating layer IL3. The second back-surface metal layer BMLb may be disposed on the same layer as a second electrode CE20 of a storage capacitor Cst. The second back-surface metal layer BMLb may be connected to a contact electrode BML2-C so as to receive a constant voltage or a signal. The contact electrode BML2-C may be disposed on the same layer as a gate GT2 of the oxide transistor O-TFT.

Each of the first back-surface metal layer BMLa and the second back-surface metal layer BMLb may contain a reflective metal. For example, each of the first back-surface metal layer BMLa and the second back-surface metal layer BMLb may contain silver (Ag), an alloy containing silver (Ag), molybdenum (Mo), an alloy containing molybdenum, aluminum (Al), an alloy containing aluminum, aluminum nitride (AlN), tungsten (W), tungsten nitride (WN), copper (Cu), p+-doped amorphous silicon, and the like. The first back-surface metal layer BMLa and the second back-surface metal layer BMLb may contain a same material or different materials.

Although not illustrated separately, according to an embodiment of the invention, the second back-surface metal layer BMLb may be omitted. The first back-surface metal layer BMLa may extend to a lower portion of the oxide transistor O-TFT so that the first back-surface metal layer BMLa may block light incident to the lower portion of the oxide transistor O-TFT.

The first semiconductor pattern SP1 may be disposed on the buffer layer BFL. The first semiconductor pattern SP1 may include a silicon semiconductor. For example, the silicon semiconductor may include amorphous silicon, polycrystalline silicon, or the like. For example, the first semiconductor pattern SP1 may include low-temperature polysilicon.

FIG. 5 illustrates only a portion of the first semiconductor pattern SP1 disposed on the buffer layer BFL, and the first semiconductor pattern SP1 may be further disposed in another region. The first semiconductor pattern SP1 may be arranged in a specific rule across the pixels. The first semiconductor pattern SP1 may have different electrical properties depending on whether it is doped or not. The first semiconductor pattern SP1 may include a first region having high conductivity and a second region having low conductivity. The first region may be doped with an N-type dopant or a P-type dopant. A P-type transistor may include a doped region doped with a P-type dopant, and an N-type transistor may include a doped region doped with an N-type dopant. The second region may be a non-doped region or a region doped with a lower concentration than the first region.

The conductivity of the first region may be greater than the conductivity of the second region, and the first region may substantially serve as an electrode or a signal line. The second region may substantially correspond to an active region (or channel) of a transistor. In other words, a portion of the first semiconductor pattern SP1 may be an active region of a transistor, another portion thereof may be a source or drain of a transistor, and still another portion thereof may be a connection electrode or a connection signal line.

A source region SE1 (or a source), an active region ACT (or a channel), and a drain region DE1 (or a drain) of the silicon transistor S-TFT may be formed from the first semiconductor pattern SPT. The source region SE1 and the drain region DE1 may extend in opposite directions from each other from the active region ACT on a cross section.

A first insulating layer IL1 may be disposed on the buffer layer BFL. The first insulating layer IL1 may overlap a plurality of pixels in common in a plan view and cover the first semiconductor pattern SPT. The first insulating layer IL1 may be an inorganic layer and/or an organic layer and have a single-layered or multi-layered structure. The first insulating layer IL1 may contain at least one of aluminum oxide, titanium oxide, silicon oxide, silicon nitride, silicon oxynitride, zirconium oxide, or hafnium oxide. In this embodiment, the first insulating layer IL1 may be a single-layered silicon oxide layer. The insulating layers of the circuit layer DP-CL to be described later as well as the first insulating layer IL1 may be an inorganic layer and/or an organic layer and have a single-layered or multi-layered structure. The inorganic layer may contain at least one of the above-described materials, but the embodiment of the invention is not limited thereto.

A gate GT1 of the silicon transistor S-TFT is disposed on the first insulating layer IL1. The gate GT1 may be a portion of a metal pattern. The gate GT1 overlaps the active region AC1 in a plan view. In the process of doping the first semiconductor pattern SP1, the gate GT1 may function as a mask. The gate GT1 may contain titanium (Ti), silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), indium tin oxide ("ITO"), indium zinc oxide ("IZO"), and the like, but the embodiment of the invention is not particularly limited thereto.

A second insulating layer IL2 may be disposed on the first insulating layer IL1 and cover the gate GT1. A third insulating layer IL3 may be disposed on the second insulating layer IL2. The second electrode CE20 of the storage capacitor Cst may be disposed between the second insulating layer IL2 and the third insulating layer IL3. In addition, a first electrode CE10 of the storage capacitor Cst may be disposed between the first insulating layer IL1 and the second insulating layer IL2.

A second semiconductor pattern SP2 may be disposed on the third insulating layer IL3. The second semiconductor pattern SP2 may include an active region AC2 of the oxide transistor O-TFT, which will be described later. The second semiconductor pattern SP2 may include an oxide semiconductor. The second semiconductor pattern SP2 may contain transparent conductive oxide ("TCO") such as indium tin oxide (ITO), indium zinc oxide (IZO), indium gallium zinc oxide ("IGZO"), zinc oxide (ZnO), or indium oxide ($In_2O_3$).

The oxide semiconductor may include a plurality of regions divided according to whether or not the transparent conductive oxide is reduced. A region in which the transparent conductive oxide has been reduced (hereinafter, a reduced region) has greater conductivity than a region in which the transparent conductive oxide has not been reduced (hereinafter, a non-reduced region). The reduced region substantially serves as a source/drain of a transistor or a signal line. The non-reduced region substantially corresponds to a semiconductor region (or an active region or channel) of a transistor. In other words, a portion of the second semiconductor pattern SP2 may be a semiconductor region of a transistor, another portion thereof may be a source region/drain region of a transistor, and still another portion thereof may be a signal transmission region.

A source region SE2 (or a source), an active region AC2 (or a channel), and a drain region DE2 (or a drain) of the oxide transistor O-TFT may be formed from the second semiconductor pattern SP2. The source region SE2 and the drain region DE2 may extend in opposite directions from each other from the active region AC2 on a cross section.

A fourth insulating layer IL4 may be disposed on the third insulating layer IL3. As illustrated in FIG. 5, the fourth insulating layer IL4 may be an insulating pattern which overlaps the gate GT2 of the oxide transistor O-TFT in a plan view and exposes the source region SE2 and the drain region DE2 of the oxide transistor O-TFT. As illustrated in FIG. 5, the fourth insulating layer IL4 may cover the second semiconductor pattern SP2.

As illustrated in FIG. 5, the gate GT2 of the oxide transistor O-TFT is disposed on the fourth insulating layer IL4. The gate GT2 of the oxide transistor O-TFT may be a portion of a metal pattern. The gate GT2 of the oxide transistor O-TFT overlaps the active region AC2 in a plan view.

A fifth insulating layer IL5 may be disposed on the fourth insulating layer IL4 and cover the gate GT2. A first connection electrode CNE1 may be disposed on the fifth insulating layer IL5. The first connection electrode CNE1 may be connected to the drain region DE1 of the silicon transistor S-TFT through a contact hole passing through the first to fifth insulating layers IL1, IL2, IL3, IL4, and IL5.

A sixth insulating layer IL6 may be disposed on the fifth insulating layer IL5. A second connection electrode CNE2 may be disposed on the sixth insulating layer IL6. The second connection electrode CNE2 may be connected to the first connection electrode CNE1 through a contact hole passing through the sixth insulating layer IL6. A seventh insulating layer IL7 may be disposed on the sixth insulating layer IL6 and cover the second connection electrode CNE2. An eighth insulating layer IL8 may be disposed on the seventh insulating layer IL7.

Each of the sixth insulating layer IL6, the seventh insulating layer IL7, and the eighth insulating layer IL8 may be an organic layer. For example, each of the sixth insulating layer IL6, the seventh insulating layer IL7, and the eighth insulating layer IL8 may contain a general-purpose polymer such as benzocyclobutene ("BCB"), polyimide, hexamethyldisiloxane ("HMDSO"), polymethylmethacrylate ("PMMA"), or polystyrene ("PS"), a polymer derivative having a phenol-based group, an acrylic-based polymer, an imide-based polymer, an aryl ether-based polymer, an amide-based polymer, a fluorine-based polymer, a p-xylene-based polymer, a vinyl alcohol-based polymer, and blends thereof.

The light-emitting element LD may include a first electrode AE, a light-emitting layer EL, and a second electrode CE. The second electrode CE may be provided in common on a plurality of light-emitting elements.

The first electrode AE of the light-emitting element LD may be disposed on the eighth insulating layer IL8. The first electrode AE of the light-emitting element LD may be a (semi-) light-transmissive electrode or a reflective electrode. According to an embodiment of the invention, each of the first electrodes AE of the light-emitting elements LD may include a reflective layer formed of Ag, Mg, Al, Pt, Pd, Au, Ni, Nd, Ir, Cr, or a compound thereof and a transparent or semi-transparent electrode layer formed on the reflective layer. The transparent or semi-transparent electrode layer may contain at least one selected from the group consisting of indium tin oxide (ITO), indium zinc oxide (IZO), indium gallium zinc oxide (IGZO), zinc oxide (ZnO), indium oxide (In2O3), and aluminum-doped zinc oxide ("AZO"). For example, the first electrode AE of the light-emitting element LD may include a stacked structure of ITO/Ag/ITO.

A pixel defining film PDL may be disposed on the eighth insulating layer IL8. The pixel defining film PDL may have a property of absorbing light. For example, the pixel defining film PDL may have a black color. The pixel defining film PDL may contain a black coloring agent. The black coloring agent may include a black dye and a black pigment. The black coloring agent may include carbon black, a metal such as chromium, or an oxide thereof. The pixel defining film PDL may correspond to a light blocking pattern having a property of blocking light.

The pixel defining film PDL may cover a portion of the first electrode AE of the light-emitting element LD. For example, the pixel defining film PDL may have an opening PDL-OP configured to expose a portion of the first electrode AE of the light-emitting element LD, the opening PDL-OP being defined therein. The pixel defining film PDL may increase the distance between the edge of the first electrode AE of the light-emitting element LD and the second electrode CE. Accordingly, the pixel defining film PDL may serve to prevent an arc from occurring at the edge of the first electrode AE.

Although not illustrated, a hole control layer may be disposed between the first electrode AE and the light-emitting layer EL. The hole control layer may include a hole transport layer and further include a hole injection layer. An electron control layer may be disposed between the light-emitting layer EL and the second electrode CE. The electron control layer may include an electron transport layer and further include an electron injection layer. The hole control layer and the electron control layer may be commonly formed in a plurality of pixels PX (see FIG. 6) by using an open mask.

An encapsulation layer TFE may be disposed on the light-emitting element layer DP-EL. The encapsulation layer TFE may include an inorganic layer TFE1, an organic layer TFE2, and an inorganic layer TFE3, which are sequentially stacked, but the layers constituting the encapsulation layer TFE are not limited thereto.

The inorganic layers TFE1 and TFE3 may protect the light-emitting element layer DP-EL from moisture and oxygen, and the organic layer TFE2 may protect the light-emitting element layer DP-EL from foreign substances such as dust particles. The inorganic layers TFE1 and TFE3 may include a silicon nitride layer, a silicon oxynitride layer, a silicon oxide layer, a titanium oxide layer, an aluminum oxide layer, or the like. The organic layer TFE2 may include an acryl-based organic layer, but the embodiment of the invention is not limited thereto.

An input sensor IS may be disposed on the display panel DP. The input sensor IS may be referred to as a sensor, an input sensing layer, or an input sensing panel. The input sensor IS may include a sensor base layer 210, a first conductive layer 220, a sensing insulating layer 230, and a second conductive layer 240.

The sensor base layer 210 may be disposed directly on the display panel DP. The sensor base layer 210 may be an inorganic layer containing at least any one of silicon nitride, silicon oxynitride, or silicon oxide. Alternatively, the sensor base layer 210 may be an organic layer containing an epoxy resin, an acrylic resin, or an imide-based resin. The sensor base layer 210 may have a single-layered structure or a multi-layered structure stacked along the third direction DR3.

Each of the first conductive layer 220 and the second conductive layer 240 may have a single-layered structure or a multi-layered structure stacked along the third direction DR3. The first conductive layer 220 and the second conductive layer 240 may include conductive lines defining a mesh-shaped sensing electrode. The conductive lines may not overlap the opening PDL-OP and may overlap the pixel defining film PDL in a plan view.

A single-layered conductive layer may include a metal layer or a transparent conductive layer. The metal layer may contain molybdenum, silver, titanium, copper, aluminum, or an alloy thereof. The transparent conductive layer may contain transparent conductive oxide such as indium tin oxide (ITO), indium zinc oxide (IZO), zinc oxide (ZnO), or indium zinc tin oxide ("IZTO"). In addition, the transparent conductive layer may contain a conductive polymer such as PEDOT, a metal nanowire, graphene, or the like.

A multi-layered conductive layer may include sequentially stacked metal layers. The metal layers may have, for example, a three-layer structure of titanium/aluminum/titanium. The multi-layered conductive layer may include at least one metal layer and at least one transparent conductive layer.

The sensing insulating layer 230 may be disposed between the first conductive layer 220 and the second conductive layer 240. The sensing insulating layer 230 may include an inorganic film. The inorganic film may include at least one of aluminum oxide, titanium oxide, silicon oxide, silicon nitride, silicon oxynitride, zirconium oxide, or hafnium oxide.

Alternatively, the sensing insulating layer 230 may include an organic film. The organic film may contain at least any one of acrylic-based resin, methacrylic-based resin, polyisoprene, vinyl-based resin, epoxy-based resin, urethane-based resin, cellulose-based resin, siloxane-based resin, polyimide-based resin, polyamide-based resin, or perylene-based resin.

The anti-reflection layer LF may be disposed on the input sensor IS. The anti-reflection layer LF may include a partition layer 310, a plurality of color filters 320, and a planarization layer 330.

A material constituting the partition layer 310 is not particularly limited as long as the material absorbs light. The partition layer 310 may have a black color, and in an embodiment of the invention, the partition layer 310 may contain a black coloring agent. The black coloring agent may include a black dye or a black pigment. The black coloring agent may include carbon black, a metal such as chromium, or an oxide thereof.

The partition layer 310 may cover the second conductive layer 240 of the input sensor IS. The partition layer 310 may prevent external light from being reflected by the second conductive layer 240. In a partial region of the display module DM, the partition layer 310 may be omitted. The light transmittance of the partial region in which the partition layer is omitted and not disposed may be higher than the light transmittance of the other region.

An opening 310-OP may be defined in the partition layer 310. The opening 310-OP may overlap the first electrode AE of the light-emitting element LD in a plan view. Any one of the plurality of color filters 320 may overlap the first electrode AE of the light-emitting element LD in a plan view. Any one of the plurality of color filters 320 may cover the opening 310-OP. Each of the plurality of color filters 320 may come in contact with the partition layer 310.

The planarization layer 330 may cover the partition layer 310 and the plurality of color filters 320. The planarization layer 330 may contain an organic material and provide a flat surface on the upper surface of the planarization layer 330. In an embodiment of the invention, the planarization layer 330 may be omitted.

Figure 6:
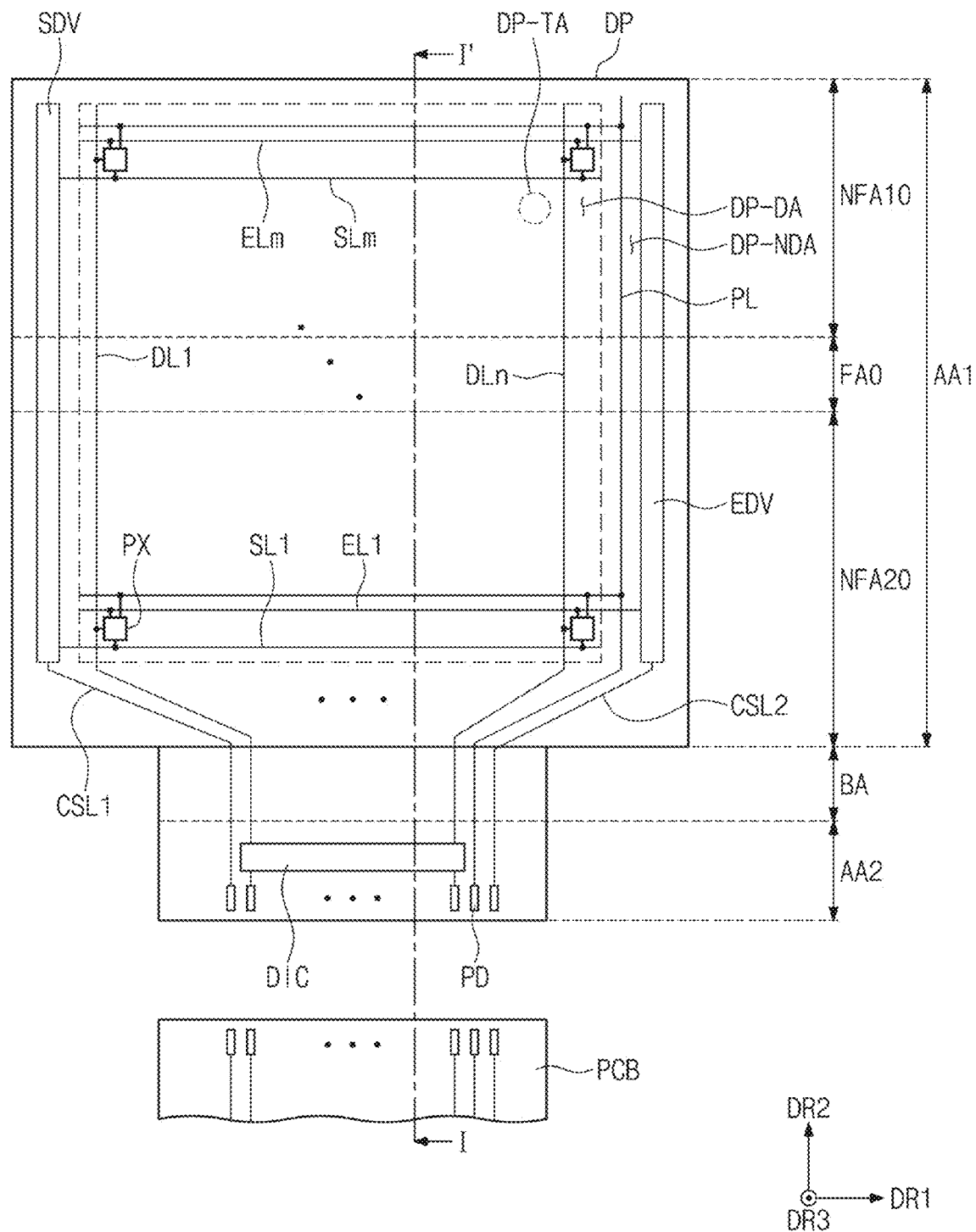
FIG. 6 is a plan view illustrating a partial configuration of the display module according to an embodiment of the invention.

FIG. 6 is a plan view illustrating a partial configuration of the display module. FIG. 6 is a plan view of a display panel DP and a printed circuit board PCB according to an embodiment of the invention.

Referring to FIG. 6, the display panel DP may include a display region DP-DA and a non-display region DP-NDA around the display region DP-DA. The display region DP-DA and the non-display region DP-NDA are divided depending on whether or not a pixel PX is disposed. The pixel PX is disposed in the display region DP-DA. A scan driver SDV, a data driver, and a light-emitting driver EDV may be disposed in the non-display region DP-NDA. The data driver may be a partial circuit configured in a driving chip DIC illustrated in FIG. 6.

In this embodiment, the signal transmission region DP-TA may have a lower resolution than the display region DP-DA. For example, the signal transmission region DP-TA may be a region in which the number of pixels disposed per unit area is smaller than the number of pixels disposed per unit area of the display region DP-DA. An optical signal may move through a region in which pixels are not disposed in the signal transmission region DP-TA.

The display panel DP includes a first region AA1, a second region AA2, and a bending region BA, which are divided in the second direction DR2. The second region AA2 and the bending region BA may be partial regions of the non-display region DP-NDA. The bending region BA is disposed between the first region AA1 and the second region AA2.

The first region AA1 corresponds to the display surface DS of the electronic device ED illustrated in FIG. 1A. The first region AA1 may include a first non-folding region NFA10, a second non-folding region NFA20, and a folding region FAO. The first non-folding region NFA10, the second non-folding region NFA20, and the folding region FAO may correspond to the first non-folding region NFA1, the second non-folding region NFA2, and the folding region FA of FIGS. 1A to 1C, respectively.

The lengths of the bending region BA and the second region AA2 along the first direction DR1 may be smaller than the length of the first region AA1. As the length of the bending region BA in the first direction DR1 is short, the bending region BA may be more easily bent.

The display panel DP may include a plurality of pixels PX, a plurality of scan lines SL1 to SLm, a plurality of data lines DL1 to DLn, a plurality of light-emitting lines ELi to ELm, first and second control lines CSL1 and CSL2, a power line PL, and a plurality of pads PD, wherein m and n are natural numbers. The pixels PX may be connected to the scan lines SL1 to SLm, the data lines DL1 to DLn, and the light-emitting lines ELi to ELm.

The scan lines SL1 to SLm may extend in the second direction DR2 to be connected to the scan driver SDV. The data lines DL1 to DLn may extend in the second direction DR2 to be connected to the driving chip DIC via the bending region BA. The light-emitting lines ELi to ELm may extend in the first direction DR1 to be connected to the light-emitting driver EDV.

The power line PL may include a portion extending in the second direction DR2 and a portion extending in the first direction DR1. The portion extending in the first direction DR1 and the portion extending in the second direction DR2 may be disposed on different layers. The portion of the power line PL extending in the second direction DR2 may extend to the second region AA2 via the bending region BA. The power line PL may provide a first voltage to the pixels PX.

The first control line CSL1 may be connected to the scan driver SDV and extend toward the lower end of the second region AA2 via the bending region BA. The second control line CSL2 may be connected to the light-emitting driver EDV and extend toward the lower end of the second region AA2 via the bending region BA.

When viewed on a plane, the pads PD may be disposed adjacent to the lower end of the second region AA2. The driving chip DIC, the power line PL, the first control line CSL1, and the second control line CSL2 may be connected to the pads PD. The printed circuit board PCB may be electrically connected to the pads PD through an anisotropic conductive adhesive layer.

Figure 7A:
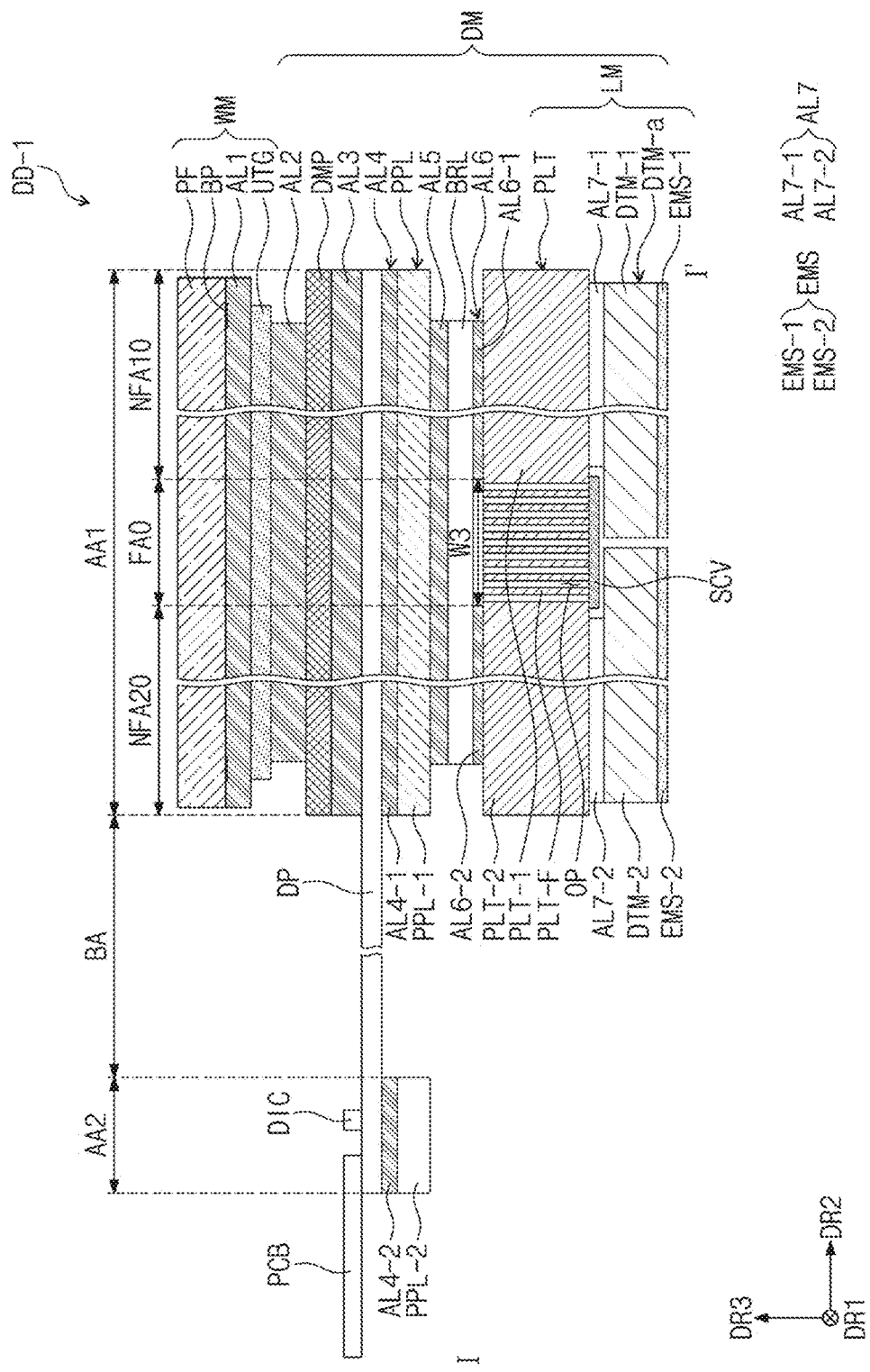
FIGS. 7A and 7B are cross-sectional views of display devices according to different embodiments of the invention, respectively.
Figure 7B:
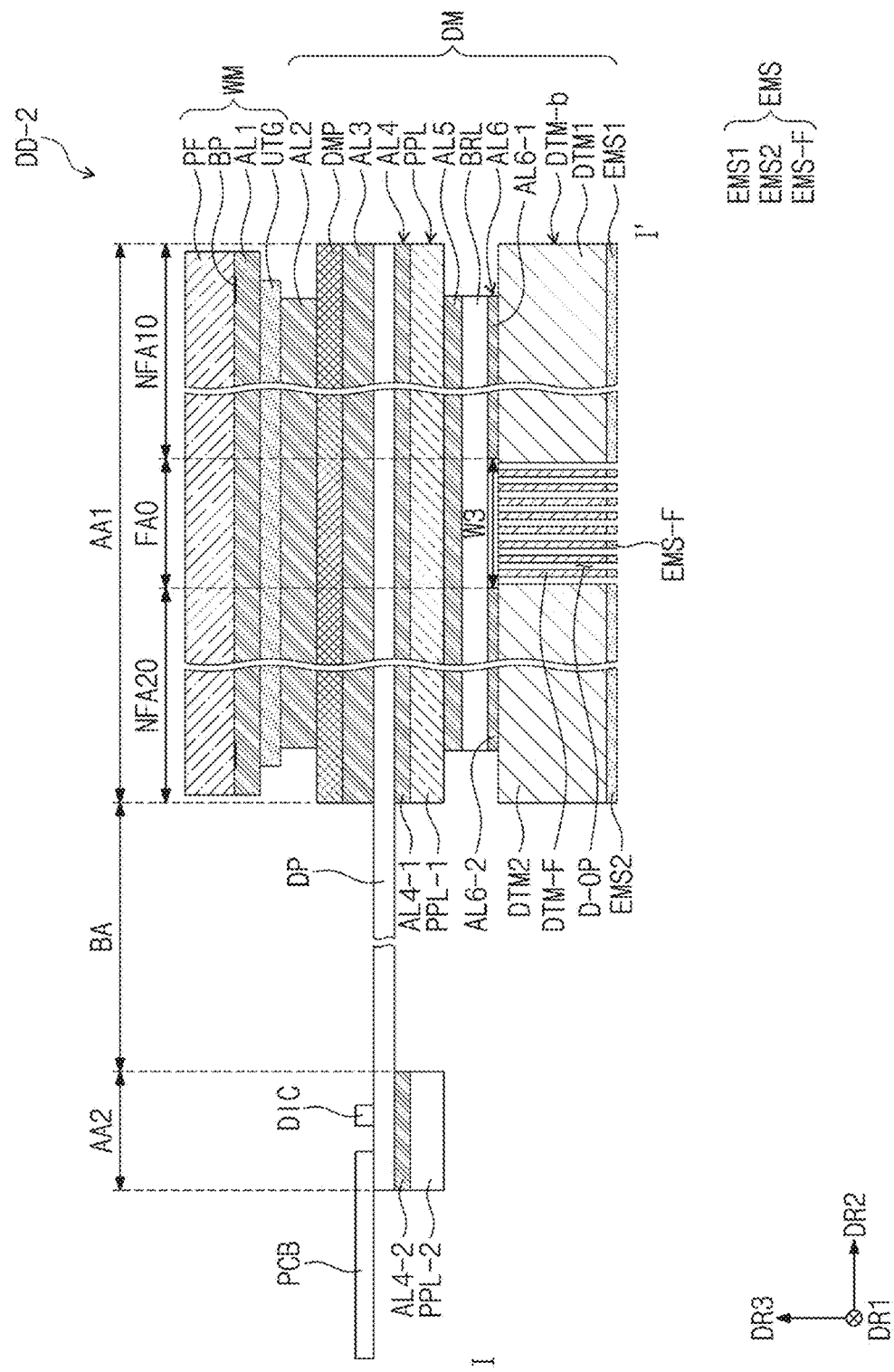
Figure 7C:
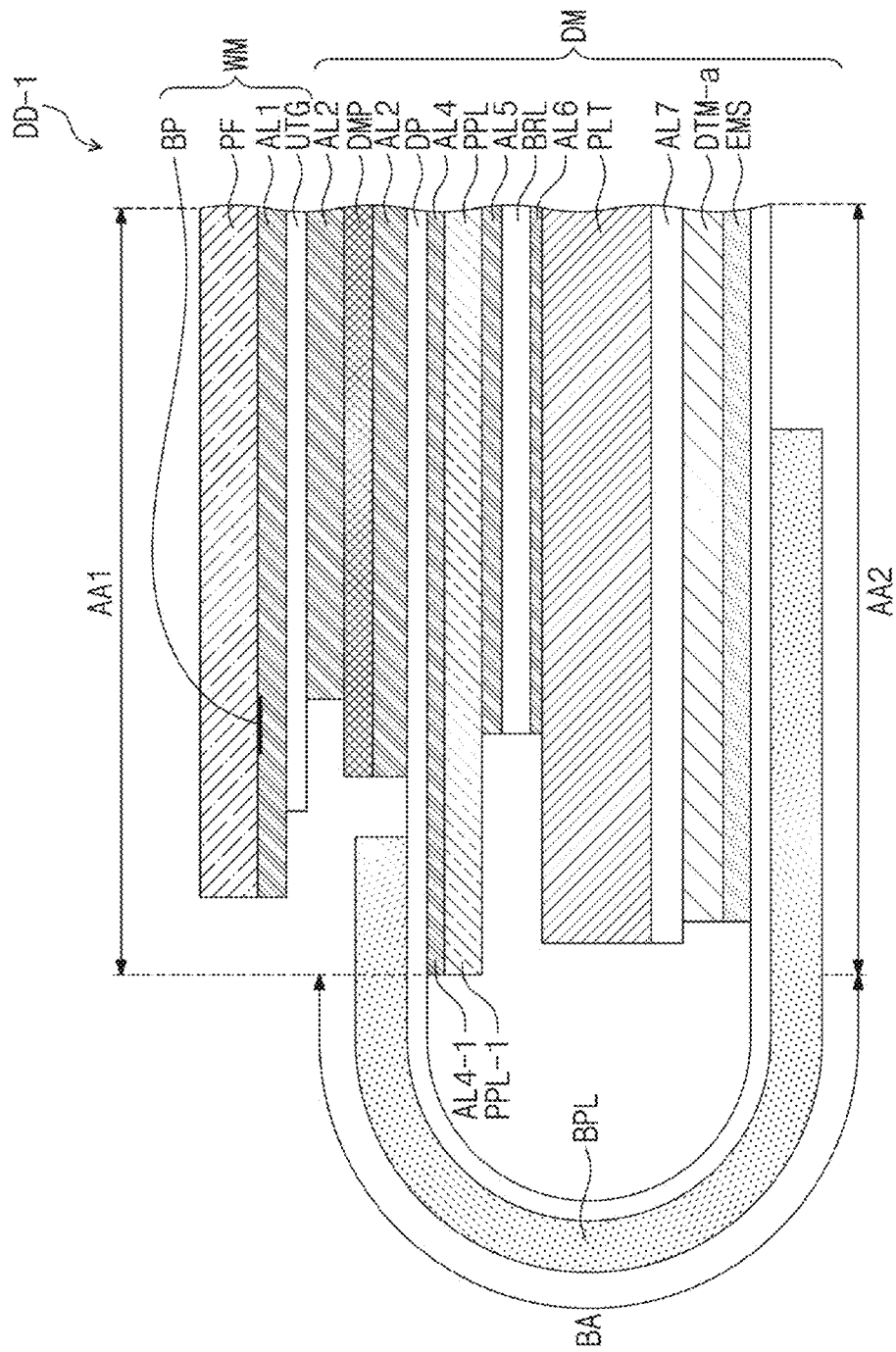
FIG. 7C is a cross-sectional view of a portion of a display device according to an embodiment of the invention.

FIGS. 7A and 7B are cross-sectional views of display devices, respectively, according to different embodiments of the invention. FIG. 7C is a cross-sectional view of a display device according to an embodiment of the invention. FIGS. 7A and 7B illustrate cross sections, respectively, according to different embodiments of the invention, which correspond to line I-I' of FIG. 6. FIG. 7C is a partial cross-sectional view of a state in which the bending region BA of FIG. 7A is bent. FIGS. 7A and 7B are views in an unfolded state before the display panel DP is bent. Assuming that the display panel DP is installed in the electronic device ED, in a state in which the electronic device ED is unfolded as illustrated FIG. 1A, the first region AA1 and the second region AA2 of the display panel DP does not overlap each other. This is illustrated in FIG. 7C. The bent shape of the bending region BA will be described later with reference to FIG. 7C.

Referring to FIGS. 7A to 7C, the display devices DD-1 and DD-2 include a window module WM and a display module DM.

The window module WM may include a thin-film glass substrate UTG, a window protective layer PF disposed on the thin-film glass substrate UTG, and a bezel pattern BP disposed on the lower surface of the window protective layer PF. In this embodiment, the window protective layer PF may include a plastic film. The window module WM may further include an adhesive layer AL1 (hereinafter, referred to as a first adhesive layer) which bonds the window protective layer PF and the thin-film glass substrate UTG to each other.

The bezel pattern BP may overlap the non-display region DP-NDA illustrated in FIG. 2 in a plan view. The bezel pattern BP may be disposed on one surface of the thin-film glass substrate UTG or one surface of the window protective layer PF. FIG. 7A exemplarily illustrates the bezel pattern BP disposed on the lower surface of the window protective layer PF. The embodiment of the invention is not limited thereto, and the bezel pattern BP may be disposed on the upper surface of the window protective layer PF in another embodiment. The bezel pattern BP may be formed as a colored light blocking layer, for example, by a coating method. The bezel pattern BP may contain a base material and a dye or pigment mixed with the base material. The bezel pattern BP may have a closed line shape on a plane.

The thickness of the thin-film glass substrate UTG may be about 15 micrometers (μm) to about 45 μm. The thin-film glass substrate UTG may be chemically strengthened glass. The thin-film glass substrate UTG may minimize the occurrence of wrinkles although folding and unfolding are repeated.

The thickness of the window protective layer PF may be about 50 μm to about 80 m. The window protective layer PF may contain polyimide, polycarbonate, polyamide, triacetylcellulose, polymethylmethacrylate or polyethylene terephthalate. Although not illustrated separately, at least one of a hard coating layer, an anti-fingerprint layer, or an anti-reflection layer may be disposed on the upper surface of the window protective layer PF.

The first adhesive layer AL1 may be a pressure sensitive adhesive film ("PSA") or an optically clear adhesive member ("OCA"). Adhesive layers to be described below may also be the same as the first adhesive layer AL1 and include a typical adhesive.

The first adhesive layer AL1 may be separated from the thin-film glass substrate UTG. Since the strength of the window protective layer PF is lower than the strength of the thin-film glass substrate UTG, scratches may occur relatively easily. After separating the window protective layer PF from the first adhesive layer AL1, a new window protective layer PF may be attached to the thin-film glass substrate UTG.

Although not illustrated separately, the window protective layer PF may include a plastic resin layer disposed directly on the upper surface of the thin-film glass substrate UTG. The plastic resin layer in contact with the upper surface of the thin-film glass substrate UTG may be formed by using an insert molding method. Before the plastic resin layer is formed, the bezel pattern BP may be formed on the upper surface of the thin-film glass substrate UTG. Accordingly, the plastic resin layer may cover the bezel pattern BP.

Although not illustrated separately, a hard coating layer may be disposed on the window protective layer PF. The hard coating layer may be disposed on the outermost surface of the display device DD and be a functional layer configured to improve the use characteristics of the display device DD. For example, the anti-fingerprint, anti-stain, and anti-scratch properties thereof may be improved by the hard coating layer.

The display module DM includes an upper film DMP, a display panel DP, a panel protective layer PPL, a barrier layer BRL, and a lower member LM. The lower member LM may include a support layer PLT, a cover layer SCV, digitizers DTM-a and DTM-b, and a functional layer EMS. Although not illustrated, the lower member LM may further include a metal sheet having a heat dissipation function, an insulating tape configured to prevent the inflow of static electricity, and the like. The display module DM may include second to seventh adhesive layers AL2 to AL7. The second to seventh adhesive layers AL2 to AL7 may contain an adhesive such as a pressure sensitive adhesive or an optically clear adhesive. In an embodiment of the invention, some of the above-described components may be omitted. Although FIGS. 7A to 7C illustrate only the display panel DP, an input sensor IS and an anti-reflection layer LF may be further disposed on the display panel DP as illustrated in FIG. 4.

The upper film DMP may absorb an external shock applied to the front surface of the display device DD. The display module DM described with reference to FIG. 4 may include an anti-reflection layer LF which replaces a polarizing film, and therefore, the impact strength of the front surface of the display device DD may be reduced. The upper film DMP may compensate for the reduced impact strength as a result of applying the anti-reflection layer LF. In an embodiment of the invention, the upper film DMP may be omitted.

The upper film DMP may include a synthetic resin film. The synthetic resin film may include polyimide, polycarbonate, polyamide, triacetylcellulose, polymethylmethacrylate or polyethylene terephthalate.

The upper film DMP may be disposed on the display panel DP to perform a function of protecting the display panel DP from an external impact. The impact resistance of the display panel DP may be improved due to the upper film DMP, and a hole or the like in the lower member LM formed to correspond to the signal transmission region DP-TA (see FIG. 6) of the display panel DP may prevent the display panel DP from sagging. The second adhesive layer AL2 bonds the upper film DMP and the window module WM to each other, and the third adhesive layer AL3 bonds the upper film DMP and the display panel DP to each other.

The panel protective layer PPL may be disposed below the display panel DP. The panel protective layer PPL may protect the lower portion of the display panel DP. The panel protective layer PPL may contain a flexible plastic material. For example, the panel protective layer PPL may contain polyethylene terephthalate. In an embodiment of the invention, the panel protective layer PPL may not be disposed on the folding region FAO. The panel protective layer PPL may include a first panel protective layer PPL-1 configured to protect the first region AA1 of the display panel DP and a second panel protective layer PPL-2 configured to protect the second region AA2 thereof.

The fourth adhesive layer AL4 bonds the panel protective layer PPL and the display panel DP to each other. The fourth adhesive layer AL4 may include a first portion AL4-1 corresponding to the first panel protective layer PPL-1 and a second portion AL4-2 corresponding to the second panel protective layer PPL-2.

When the bending region BA is bent, the second panel protective layer PPL-2, together with the second region AA2, may be disposed below the first region AA1 and the first panel protective layer PPL-1 even though omitted in FIG. 7C. Since the panel protective layer PPL is not disposed on the bending region BA, the bending region BA may be more easily bent.

The bending region BA has a predetermined curvature and a predetermined curvature radius. The curvature radius may be about 0.1 millimeters (mm) to about 0.5 mm. A bending protective layer BPL is disposed at least in the bending region BA. The bending protective layer BPL may overlap the bending region BA, the first region AA1, and the second region AA2. The bending protective layer BPL may be disposed on a portion of the first region AA1 and a portion of the second region AA2.

The bending protective layer BPL may be bent together with the bending region BA. The bending protective layer BPL protects the bending region BA from an external impact and controls the neutral surface of the bending region BA. The bending protective layer BPL may control the stress of the bending region BA so that the neutral surface becomes close to the signal lines disposed in the bending region BA.

The fifth adhesive layer AL5 couples the panel protective layer PPL and the barrier layer BRL to each other. The barrier layer BRL may be disposed below the panel protective layer PPL. The barrier layer BRL may increase resistance to a compressive force caused by external pressing. Accordingly, the barrier layer BRL may serve to prevent deformation of the display panel DP. The barrier layer BRL may contain a flexible plastic material such as polyimide or polyethylene terephthalate. In addition, the barrier layer BRL may be a colored film having low light transmittance. The barrier layer BRL may absorb light incident from the outside. For example, the barrier layer BRL may be a black plastic film. When the display device DD is viewed from above a window protective layer WP, components disposed below the barrier layer BRL may not be visually recognized by a user.

Referring to FIG. 7A, the sixth adhesive layer AL6 may couple the barrier layer BRL and the support layer PLT to each other. Referring to FIG. 7B, in another embodiment of the invention, the sixth adhesive layer AL6 may couple the barrier layer BRL and the digitizer DTM-b to each other. Accordingly, in the display device DD-2 according to an embodiment of the invention, the support layer PLT may not be included in the lower member LM.

The sixth adhesive layer AL6 may include a first adhesive portion AL6-1 and a second adhesive portion AL6-2, which are spaced apart from each other. The separated distance W3 between the first adhesive portion AL6-1 and the second adhesive portion AL6-2, that is, the space between the first adhesive portion AL6-1 and the second adhesive portion AL6-2 may correspond to the width of the folding region FAO. The separated distance W3 of the first adhesive portion AL6-1 and the second adhesive portion AL6-2 may be about 7 mm to about 15 mm, preferably about 9 mm to about 12 mm.

In this embodiment, the first adhesive portion AL6-1 and the second adhesive portion AL6-2 are defined as different portions of one adhesive layer, but the embodiment of the invention is not limited thereto. When the first adhesive portion AL6-1 is defined as one adhesive layer (e.g., the first adhesive layer), the second adhesive portion AL6-2 may be defined as another adhesive layer (e.g., the second adhesive layer).

Referring to FIGS. 7A and 7C, the display device DD-1 may include a support layer PLT disposed below the barrier layer BRL. The support layer PLT supports components disposed thereabove and maintains the folded or unfolded state of the display device DD. The support layer PLT includes at least a first support portion PLT-1 corresponding to the first non-folding region NFA10 and a second support portion PLT-2 corresponding to the second non-folding region NFA20. The first support portion PLT-1 and the second support portion PLT-2 are spaced apart from each other in the second direction DR2.

As in this embodiment, the support layer PLT may further include a folding part PLT-F corresponding to the folding region FAO, disposed between the first support portion PLT-1 and the second support portion PLT-2, and having a plurality of openings OP defined therein. As the plurality of openings OP are defined in the folding part PLT-F, it is possible to reduce stress applied to the support layer PLT during the folding operation illustrated in FIGS. 1B and 1C. The plurality of openings OP defined in the folding part PLT-F may be provided in a plurality of rows misaligned with each other.

The material of the support layer PLT may be selected from materials capable of transmitting, without loss or with minimal loss, a magnetic field generated by digitizers DTM-a and DTM-b to be described later. The support layer PLT may contain a non-metal material. The support layer PLT may contain plastic, glass fiber reinforced plastic, or glass. The support layer PLT may contain, for example, carbon fiber reinforced plastic ("CFRP"). The first support portion PLT-1, the second support portion PLT-2, and the folding part PLT-F included in the support layer PLT may contain a same material. The first support portion PLT-1, the second support portion PLT-2, and the folding part PLT-F may have an integral shape.

A plurality of openings OP may be defined in a partial region of the support layer PLT, which corresponds to the folding region FAO. The plurality of openings OP may be defined in the folding part PLT-F of the support layer PLT. The flexibility of the support layer PLT is improved by the openings OP. Since the sixth adhesive layer AL6 is not disposed in a region corresponding to the folding region FAO, the flexibility of the support layer PLT may be improved.

The seventh adhesive layer AL7 and the cover layer SCV are disposed below the support layer PLT. Hereinafter, in this specification, the seventh adhesive layer AL7 may be referred to as a lower adhesive layer.

The cover layer SCV may be manufactured in the form of a sheet and attached to the support layer PLT. The cover layer SCV may have a lower elastic modulus than the support layer PLT. For example, the cover layer SCV may contain at least one of thermoplastic polyurethane ("TPU"), rubber, or silicone. Although not illustrated, the cover layer SCV may be attached below the support layer PLT by a separate additional adhesive layer.

The seventh adhesive layer AL7 may include a first lower adhesive layer AL7-1 disposed below the first support portion PLT-1 and a second lower adhesive layer AL7-2 disposed below the second support portion PLT-2.

The digitizers DTM-a and DTM-b, also called an EMR sensing panel, include a plurality of loop coils that generate a magnetic field of a preset resonant frequency with an electronic pen. The magnetic field formed in the loop coils is applied to an LC resonance circuit composed of an inductor (coil) and a capacitor of the electronic pen. The coil generates a current by the received magnetic field and transfers the generated current to the capacitor. Accordingly, the capacitor is charged with the current input from the coil and discharges the charged current to the coil. As a result, the magnetic field of the resonant frequency is emitted to the coil. The magnetic field emitted by the electronic pen may be absorbed again by the loop coil of the digitizer, and accordingly, it is possible to determine to which position the electronic pen is adjacent on the touch screen.

Referring to FIG. 7A, the digitizer DTM-a may include a first digitizer DTM-1 attached below the first lower adhesive layer AL7-1 and a second digitizer DTM-2 attached below the second lower adhesive layer AL7-2. The first digitizer DTM-1 and the second digitizer DTM-2 may be disposed to be spaced apart from each other with a predetermined gap therebetween. The gap may be about 0.3 mm to about 3 mm. More preferably, the gap may be about 0.4 mm to about 2 mm. The gap may be defined so as to correspond to the folding region FAO.

Referring to FIG. 7B, in the display device DD-2 according to another embodiment of the invention, the digitizer DTM-b includes a first non-folding portion DTM1 corresponding to the first non-folding region NFA10 and a second non-folding portion DTM2 corresponding to the second non-folding region NFA20. The first non-folding portion DTM1 and the second non-folding portion DTM2 are spaced apart from each other in the second direction DR2.

As in this embodiment, the digitizer DTM-b may further include a folding portion DTM-F corresponding to the folding region FAO, disposed between the first non-folding portion DTM1 and the second non-folding portion DTM2, and having a plurality of holes D-OP defined therein. The plurality of holes D-OP defined in the folding portion DTM-F may be provided in a plurality of rows misaligned with each other.

Referring to FIGS. 7A to 7C, a functional layer EMS may be disposed below the digitizers DTM-a and DTM-b. The functional layer EMS may be a portion formed directly on the lower surface of the digitizers DTM-a and DTM-b through coating and curing processes. Although not illustrated, the functional layer EMS may be disposed below the digitizers DTM-a and DTM-b by a separate adhesive layer.

The functional layer EMS may block electromagnetic waves generated from the electronic module ELM, the control module EM and the like illustrated in FIG. 2 from affecting the digitizers DTM-a and DTM-b as noise and improve the heat dissipation of the display device due to its high thermal conductivity. The detailed descriptions of the digitizers DTM-a and DTM-b and the functional layer EMS will be given later.

Referring to FIGS. 7A and 7C, the functional layer EMS may include a first functional layer EMS-1 and a second functional layer EMS-2 corresponding to the first digitizer DTM-1 and the second digitizer DTM-2, respectively. Referring to FIG. 7B, in another embodiment of the invention, the functional layer EMS may include a first non-folding functional portion EMS1, a second non-folding functional portion EMS2, and a folding functional portion EMS-F corresponding to a first non-folding portion DTM1, a second non-folding portion DTM2, and a folding portion DTM-F, respectively.

FIGS. 8A to 8D are cross-sectional views of lower members LM-1, LM-21, LM-22, and LM-23, respectively, according to different embodiments of the invention.

Figure 8A:
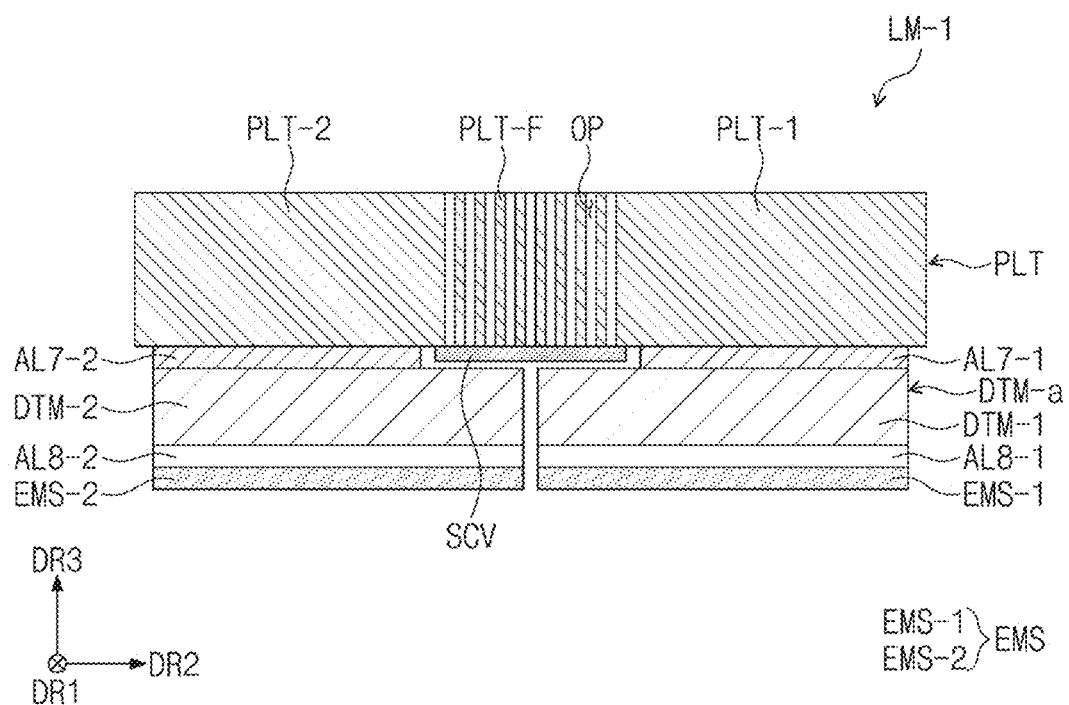

Referring to FIG. 8A, the lower member LM-1 may include a support layer PLT, a cover layer SCV, a digitizer DTM-a, and functional layers EMS-1 and EMS-2. The lower member LM-1 may be composed of a support layer PLT, a cover layer SCV, a digitizer DTM-a, and functional layers EMS-1 and EMS-2.

Alternatively, the lower member LM-1 may include seventh adhesive layers AL7-1 and AL7-2 disposed between the support layer PLT and the digitizer DTM-a, and eighth adhesive layers AL8-1 and AL8-2 disposed between the digitizer DTM-a and the functional layer EMS. Each of the seventh adhesive layers AL7-1 and AL7-2 and the eighth adhesive layers AL8-1 and AL8-2 may include an adhesive such as a pressure-sensitive adhesive or an optically clear adhesive. However, the embodiment of the invention is not limited thereto, and in another embodiment of the invention, at least any one of the cover layer SCV or the adhesive layers AL7-1, AL7-2, AL8-1, AL8-2, which have been described above, may be omitted.

Figure 8B:
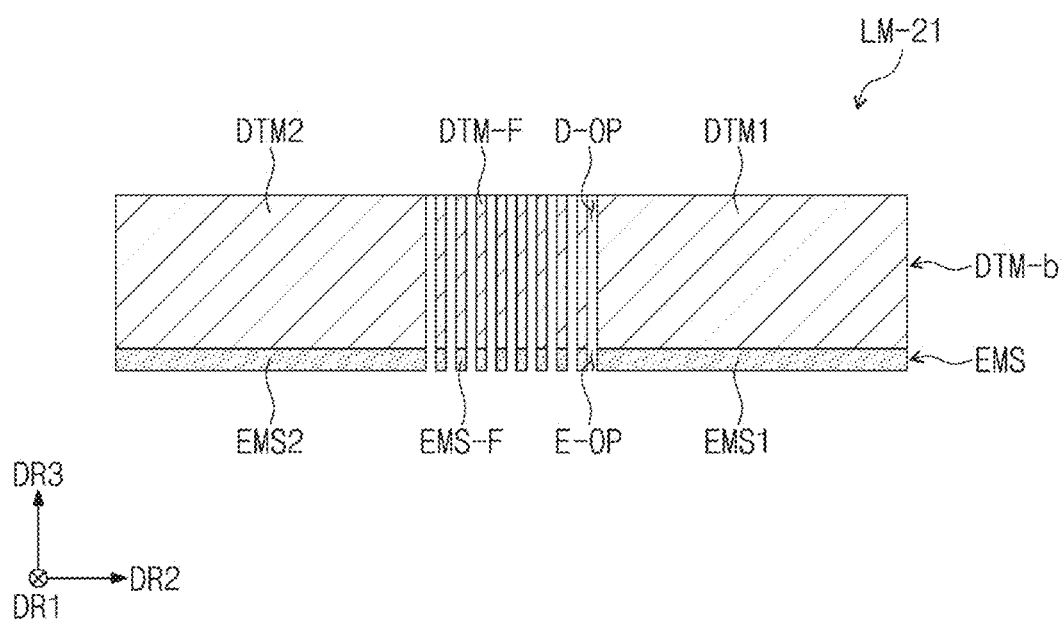
Figure 8C:
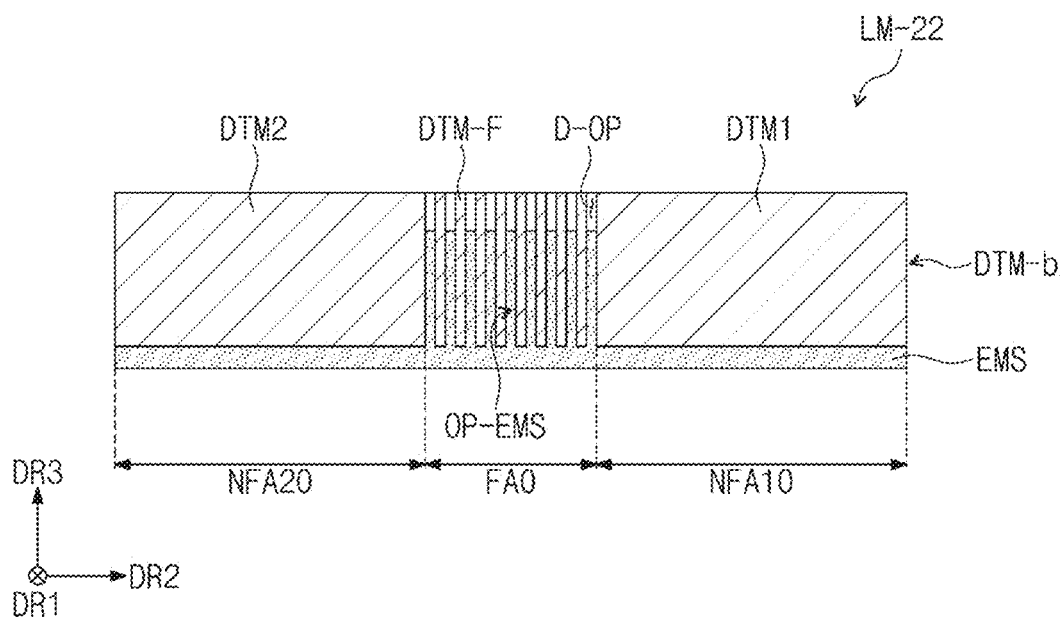
Figure 8D:
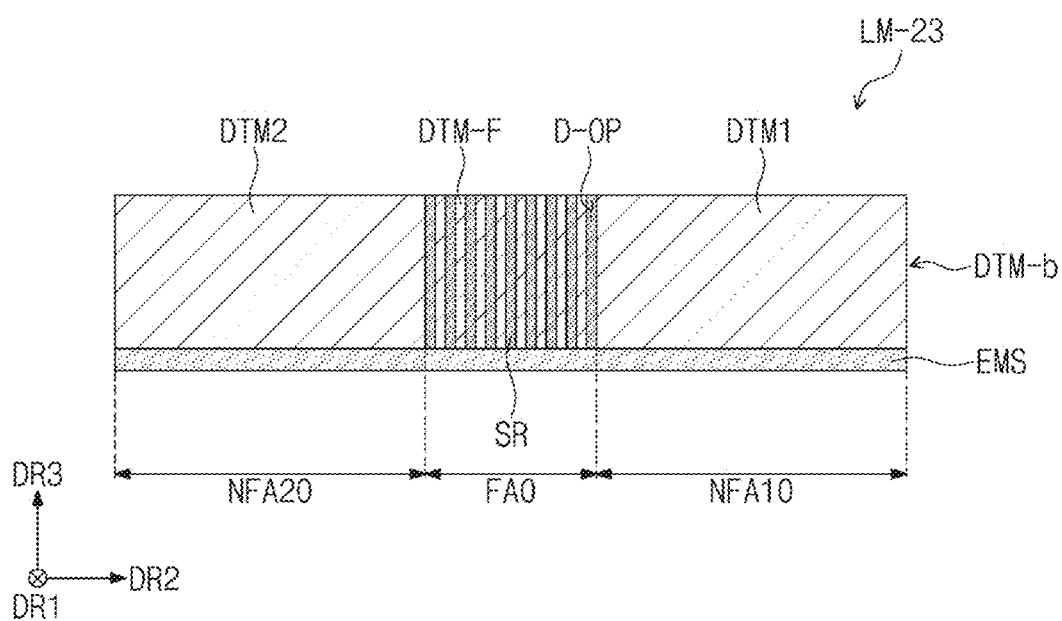

Referring to FIGS. 8B to 8D, the lower members LM-21, LM-22, and LM-23 according to another embodiment of the invention may include a digitizer DTM-b and a functional layer EMS. In an embodiment of the invention, the lower members LM-21 and LM-22 may be composed of a digitizer DTM-b and a functional layer EMS.

Referring to FIG. 8B, the functional layer EMS may be disposed to correspond to the digitizer DTM-b. That is, the functional layer EMS may include a first non-folding functional portion EMS1 corresponding to the first non-folding portion DTM1, a second non-folding functional portion EMS2 corresponding to the second non-folding portion DTM2, and a folding functional portion EMS-F corresponding to the folding portion DTM-F. The folding functional portion EMS-F may be disposed between the first non-folding functional portion EMS1 and the second non-folding functional portion EMS2 and have a plurality of functional holes E-OP defined therein. The plurality of functional holes E-OP may correspond to the plurality of holes D-OP. The folding functional portion EMS-F may be formed directly on the lower surface of the folding portion DTM-F through a coating process.

Referring to FIGS. 8C and 8D, the functional layer EMS may be disposed below the digitizer DTM-b so as to completely overlap the first and second non-folding regions NFA10 and NFA20 and the folding region FAO. Referring to FIG. 8C, the functional layer EMS may further include a hole functional portion OP-EMS disposed in the plurality of holes D-OP of the digitizer DTM-b and overlapping the folding region FAO. Although not illustrated, the hole functional portion OP-EMS may completely fill the plurality of holes D-OP so that the holes D-OP may not be separately defined.

Referring to FIG. 8D, the lower member LM-23 may further include a resin layer SR. The resin layer SR may overlap the folding region FAO and be disposed in the plurality of holes D-OP of the digitizer DTM-b. The resin layer SR may fill the plurality of holes D-OP defined in the digitizer DTM-b. The resin layer SR may contain at least any one of a urethane-based resin, an epoxy-based resin, a polyester-based resin, a polyether-based resin, an acrylate-based resin, or an acrylonitrile-butadiene-styrene ("ABS") resin. The material contained in the resin layer SR may be different from the material contained in the functional layer EMS.

In FIGS. 8A to 8D, the functional layer EMS contains MXene. The functional layer EMS may contain any one of a transition metal carbide, a transition metal nitride, and a transition metal carbonitride, which have a layered structure. The functional layer EMS may include a sheet of a two-dimensional inorganic material. The functional layer EMS may be composed of a composition containing MXene or an organic composition in which MXene is dispersed. The functional layer EMS may be formed through a coating process using an ink containing MXene.

MXene contained in the functional layer EMS may include one layer in which crystals having a chemical formula of $M_{n+1}X_n$ or a chemical formula of $M'_2M''_nX_{n+1}$ form a two-dimensional arrangement. In the above formulas, M, M' and M" may each independently represent any one of a group IIIB metal, a group IVB metal, a group VB metal, and a group VIB metal, and M' and M" may be different metals. X may be C, N or a combination thereof, and n may be an integer of 1 to 4. For example, M, M' and M" may each independently be Sc, Y, Lu, Ti, Zr, Hf, V, Nb, Ta, Cr, Mo, W, or a combination thereof, and the above formulas may be $Ti_2C$, $Ti_3C_2$, $Nb_2C$, $V_2C$, $Ta_4C_3$, $Nb_4C_3$, $Zr_3C_2$, $Ti_4N_3$, $V_4C_3$, $Mo_2N$, $Cr_2C$, $Zr_2C$, $Nb_2C$, $Hf_2C$, $V_3C_2$, $Ta_3C_2$, $Ti_2NbC_2$, $Cr_2Ti_2C_3$, or $Ti_4C_3$. However, the type of MXene is not limited thereto.

In this embodiment, the functional layer EMS may contain neither copper (Cu) nor magnetic metal powder ("MMP"). Accordingly, the thickness of the functional layer EMS may be about 0.1 micrometer to about 10 micrometers, and the sum of the thickness of the functional layer EMS and the thickness of the above-described digitizer DMS may be about 60 micrometers to about 90 micrometers.

In the case of the display device according to an embodiment of the invention, by having one functional layer containing MXene included below the display panel, functions such as shielding and heat dissipation may be simultaneously obtained by one functional layer. In a typical display device, a shielding layer for electromagnetic shielding and a heat dissipation layer for performing a heat dissipation function are separately provided. In this invention, however, since one functional layer containing MXene performs both the functions at the same time, a lower metal plate, a heat dissipation layer, and the like included in a typical folding display device may not be included. Accordingly, the display device according to the invention may reduce the number of functional members positioned below the display panel, thereby reducing the thickness of the display device, simplifying parts, and improving folding characteristics. In addition, when compared to magnetic metal powder (MMP) and copper (Cu) contained in a shielding layer of a typical display device, MXene may be coated thinly in the form of an ink composition. Accordingly, MXene may be coated in the form of an ink composition on the lower surface of the digitizer having a plurality of holes. Therefore, in the case of the display device according to an embodiment of the invention, the thickness of the display device may be reduced and the method of manufacturing the display device may be simplified, when compared to a typical display device.

FIGS. 9A and 9B are plan views of digitizers DTM-a and DTM-b according to different embodiments of the invention. FIG. 9C is a plan view illustrating a partial region of a sensing region SA of a digitizer according to an embodiment of the invention. FIG. 9D is a cross-sectional view of the sensing region SA of the digitizer according to an embodiment of the invention of FIG. 9C. FIG. 9D illustrates a cross section of an embodiment, which corresponds to line III-III' of FIG. 9C.

Referring to FIG. 9A, the digitizer DTM-a according to an embodiment of the invention may include a first digitizer DTM-1 and a second digitizer DTM-2 spaced apart from each other. A first flexible circuit film FCB1 and a second flexible circuit film FCB2 may be electrically connected to the first digitizer DTM-1 and the second digitizer DTM-2, respectively. The first flexible circuit film FCB1 and the second flexible circuit film FCB2 may be connected to a same circuit board. The first flexible circuit film FCB1 and the second flexible circuit film FCB2 may be replaced with one circuit film. The first digitizer DTM-1 and the second digitizer DTM-2 include a first sensing region SA1 and a second sensing region SA2 and a first non-sensing region NSA1 and a second non-sensing region NSA2 as well, respectively. The first non-sensing region NSA1 and the second non-sensing region NSA2 may be disposed adjacent to the first sensing region SA1 and the second sensing region SA2, respectively. The first sensing region SA1 and the second sensing region SA2 may be defined as regions configured to sense an input of an electronic pen.

Referring to FIG. 9B, the digitizer DTM-b according to another embodiment of the invention may include a first non-folding portion DTM1 and a second non-folding portion DTM2 spaced apart from each other. The digitizer DTM-b may include a folding portion DTM-F disposed between the first non-folding portion DTM1 and the second non-folding portion DTM2. Although not illustrated, the first non-folding portion DTM1, the second non-folding portion DTM2, and the folding portion DTM-F may be electrically connected to a flexible circuit film FCB by a conductive pattern or the like. The digitizer DTM-2 may include a sensing region SA and a non-sensing region NSA. The sensing region SA may be defined as a region configured to sense an input of an electronic pen.

Referring to FIGS. 2, 9A and 9B, the first flexible circuit film FCB1, the second flexible circuit film FCB2, and the flexible circuit film FCB may be connected to a printed circuit board PCB, a main circuit board connected to the printed circuit board PCB, or the like.

As illustrated in FIG. 9C, the sensing region SA may include a plurality of first loop coils 510 (hereinafter, referred to as first coils) and a plurality of second loop coils 520 (hereinafter, referred to as second coils). The first coils 510 may be referred to as driving coils, and the second coils 520 may be referred to as sensing coils, but the embodiment of the invention is not limited thereto, and it may be the other way around.

Each of the first coils 510 is arranged along the first direction DR1 and extends along the second direction DR2. Each of the second coils 520 extends along the first direction DR1, and the second coils 520 may be arranged to be spaced apart from each other in the second direction DR2. Unlike the illustration in FIG. 9C, the first coils 510 may be arranged so that adjacent coils overlap each other in a plan view. A bridge pattern may be disposed in the cross region of the first coils 510. The second coils 520 may be arranged so that adjacent coils overlap each other in a plan view. A bridge pattern may be disposed in the cross region of the second coils 520.

Alternating current signals may be sequentially provided to first terminals 510t of the first coils 510. The first terminals 510t and the other terminals of the first coils 510 may be grounded. Signal lines may be connected to the first terminals 510t of the first coils 510, respectively, but are not illustrated in FIG. 9C. These signal lines may be disposed in the non-sensing region NSA illustrated in FIG. 9A.

When a current flows through the first coils 510, a magnetic force line may be induced between the first coils 510 and the second coils 520. The second coils 520 may sense the induced electromagnetic force emitted from the electronic pen and output the induced electromagnetic force as a sensing signal to the second terminals 520t of the second coils 520. The second terminals 520t and the other terminals of the second coils 520 may be grounded. Signal lines may be connected to the second terminals 520t of the second coils 520, respectively, but are not illustrated in FIG. 9C. These signal lines may be disposed in the non-sensing region NSA illustrated in FIG. 9A.

Referring to FIG. 9D, one digitizer DTM according to the invention includes a base layer DTM-BL, first coils 510 disposed on one surface of the base layer DTM-BL, and second coils 520 disposed on the other surface of the base layer DTM-BL.

The base layer DTM-BL may include a plastic film, for example, a polyimide film. The base layer DTM-BL may contain a material having a predetermined rigidity. The base layer DTM-BL may contain a material having a relatively high resistance to a compressive force such as external pressing. For example, the base layer DTM-BL may contain a fiber-reinforced composite material. The fiber-reinforced composite material may include carbon fiber reinforced plastic ("CFRP") or glass fiber reinforced plastic ("GFRP"). However, the fiber-reinforced material is not limited to the above examples.

Since the base layer DTM-BL includes the fiber-reinforced composite material, heat generated from the first coils 510 and the second coils 520 when the digitizer DTM is driven may be easily dissipated. Accordingly, it is possible to prevent the digitizer DTM and components disposed adjacent to the digitizer DTM from being damaged by the heat generated by the digitizer DTM. Since the digitizer DTM includes the base layer DTM-BL having predetermined rigidity and strength, the display panel DP (see FIG. 7A) may be supported without a separate support plate disposed between the display panel DP (see FIG. 7A) and the digitizer DTM. That is, the stacked configuration of the display device may be simplified by omitting the additional support plate.

The first coils 510 and the second coils 520 may include a metal, such as gold (Au), silver (Ag), copper (Cu), or aluminum (Al). However, the materials of the first coils 510 and the second coils 520 are not limited to the above examples.

Insulation layers PL-D1 and PL-D2 configured to protect the first coils 510 and the second coils 520 may be disposed on one surface and the other surface of the base layer DTM-BL. In this embodiment, the insulation layers PL-D1 and PL-D2 may include a first coil insulating layer PL-D1 disposed on the first coils 510 and a second coil insulating layer PL-D2 disposed on the second coils 520. Each of the first coil insulating layer PL-D1 and the second coil insulating layer PL-D2 may contain any one of an inorganic material and an organic material.

Referring to FIGS. 7A and 7B together with FIG. 9D, the display devices DD-1 and DD-2 according to the invention may have a structure in which only one functional layer EMS containing MXene is disposed below the digitizer DTM. The functional layer EMS may be disposed directly below the second coil insulating layer PL-D2 included in the digitizer DTM. The functional layer EMS may be formed by being coated directly below the second coil insulating layer PL-D2 without a separate base substrate. The lower member LM may not additionally include separate members for a heat dissipation function besides the functional layer EMS. For example, in the display device according to the invention, a separate lower metal plate, a separate heat dissipation layer, or a separate shielding layer containing metal magnetic powder (MMP) may not be disposed. Accordingly, the display device according to an embodiment of the invention may implement the effect of reducing its thickness and simplifying its parts.

Hereinafter, a method of manufacturing a display device according to an embodiment of the invention will be described with reference to the drawings.

FIG. 10 is a flowchart showing a method of manufacturing a display device according to an embodiment of the invention.

Referring to FIG. 10, the method of manufacturing a display device according to an embodiment of the invention includes: providing a preliminary display module including a display panel and a digitizer disposed below the display panel (S100), and coating a composition containing MXene below the digitizer (S200).

Referring to FIGS. 10 and 7A together, the method of manufacturing the display device according to an embodiment of the invention includes: providing the preliminary display module including the display panel DP and the digitizer DTM disposed below the display panel DP. The display panel DP may include a first non-folding region NFA10, a second non-folding region NFA20, and a folding region FA0 disposed between the first non-folding region NFA10 and the second non-folding region NFA20. In an embodiment of the invention, the preliminary display module may have a structure that further includes a support layer PLT disposed between the display panel DP and the digitizer DTM.

The method of manufacturing the display device according to an embodiment of the invention includes: coating a composition containing MXene below the digitizer DTM. Accordingly, the above-described functional layer EMS may be formed in the display device. The composition containing MXene may be an organic composition in which MXene is dispersed in a base resin. The base resin may be, for example, an acrylic-based resin, an epoxy-based resin, a silicone-based resin, or a urethane-based resin.

The coating of the MXene composition may include applying the composition containing MXene. The MXene composition may be formed by using a variety of methods such as spin coating, casting, Langmuir-Blodgett (LB), inkjet printing, laser printing, and laser induced thermal imaging ("LITI"). The MXene composition may be directly coated below the second coil insulating layer PL-D2 (see FIG. 9D) of the above-described digitizer DTM (see FIG. 9D). Accordingly, the functional layer EMS (see FIG. 7A) configured to perform electromagnetic wave shielding and heat dissipation functions without a separate base substrate may be formed directly on the lower surface of the digitizer DTM (see FIG. 9D).

Since the display device according to the invention includes one functional layer, it is possible to reduce the number of functional members positioned below the display panel, thereby reducing the thickness of the display device, simplifying parts, and effectively improving folding characteristics.

Although the above has been described with reference to preferred embodiments of the invention, those skilled in the art or those of ordinary skill in the art will understand that various modifications and changes can be made to the invention within the scope that does not depart from the spirit and technical field of the invention described in the claims to be described later. Accordingly, the technical scope of the invention should not be limited to the content described in the detailed description of the specification, but should be determined by the claims described hereinafter.

What is claimed is:

1. A display device comprising:
   a display panel comprising a first non-folding region, a second non-folding region, and a folding region disposed between the first non-folding region and the second non-folding region; and
   a lower member disposed below the display panel,
   wherein the lower member comprises:
      a digitizer disposed below the display panel and comprising a base layer and a plurality of coils disposed on one surface of the base layer; and
      a functional layer disposed below the digitizer,
   wherein the functional layer comprises MXene.

2. The display device of claim 1, wherein the functional layer comprises neither magnetic metal powder (MMP) nor copper (Cu).

3. The display device of claim 1, wherein the functional layer comprises at least one of a transition metal carbide, a transition metal nitride, and a transition metal carbonitride.

4. The display device of claim 1, wherein the functional layer comprises a sheet of a two-dimensional inorganic material.

5. The display device of claim 1, wherein a thickness of the functional layer is about 0.1 micrometer to about 10 micrometers.

6. The display device of claim 1, wherein a sum of the thickness of the functional layer and the thickness of the digitizer is about 60 micrometers to about 90 micrometers.

7. The display device of claim 1, further comprising
   a barrier layer disposed between the display panel and the lower member.

8. The display device of claim 1, further comprising:
   an adhesive layer disposed between the functional layer and the digitizer.

9. The display device of claim 1, wherein the lower member further comprises a support layer comprising:
   a first support portion overlapping the first non-folding region;
   a second support portion overlapping the second non-folding region; and
   a folding part overlapping the folding region and having a plurality of openings defined therein.

10. The display device of claim 9, wherein the digitizer comprises:
    a first digitizer corresponding to the first support portion; and
    a second digitizer corresponding to the second support portion and spaced apart from the first digitizer.

11. The display device of claim 10, wherein the functional layer comprises:
    a first functional layer in contact with a lower surface of the first digitizer; and
    a second functional layer in contact with a lower surface of the second digitizer,
    wherein each of the first functional layer and the second functional layer comprises the MXene.

12. The display device of claim 9, further comprising a cover layer disposed between the support layer and the digitizer and attached to and below the folding part.

13. The display device of claim 1, wherein the digitizer comprises:
    a folding portion overlapping the folding region and having a plurality of holes defined therein;
    a first non-folding portion overlapping the first non-folding region; and
    a second non-folding portion overlapping the second non-folding region.

14. The display device of claim 13, wherein the functional layer is disposed directly on a lower surface of each of the first non-folding portion, the second non-folding portion, and the folding portion.

15. The display device of claim 13, wherein at least a portion of the functional layer is disposed in the plurality of holes.

16. The display device of claim 13, wherein the lower member further comprises a resin layer disposed in the plurality of holes.

17. The display device of claim 13, wherein the lower member is composed of the digitizer and the functional layer.

18. A method for manufacturing a display device, the method comprising:
- providing a preliminary display module comprising a display panel comprising a first non-folding region, a second non-folding region, and a folding region disposed between the first non-folding region and the second non-folding region, and a digitizer disposed below the display panel; and
- coating a composition comprising MXene below the digitizer.

19. The method of claim 18, wherein the preliminary display module further comprises a support layer disposed between the display panel and the digitizer.

20. The method of claim 18, wherein the coating of the composition comprises coating an ink comprising MXene below the digitizer.

\* \* \* \* \*